(12) United States Patent
Mori et al.

(10) Patent No.: US 11,993,833 B2
(45) Date of Patent: May 28, 2024

(54) SOFT MAGNETIC METAL POWDER COMPRISING A METAL OXIDE COVERING, AND ELECTRONIC COMPONENT

(71) Applicant: TDK Corporation, Tokyo (JP)

(72) Inventors: Satoko Mori, Tokyo (JP); Kazuhiro Yoshidome, Tokyo (JP); Akito Hasegawa, Tokyo (JP); Hiroyuki Matsumoto, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 16/939,484

(22) Filed: Jul. 27, 2020

(65) Prior Publication Data

US 2021/0035720 A1 Feb. 4, 2021

(30) Foreign Application Priority Data

Jul. 31, 2019 (JP) .................................. 2019-141151
May 15, 2020 (JP) .................................. 2020-086017

(51) Int. Cl.
*C22C 38/00* (2006.01)
*B22F 1/08* (2022.01)
(Continued)

(52) U.S. Cl.
CPC .............. *C22C 38/002* (2013.01); *B22F 1/08* (2022.01); *C22C 38/12* (2013.01); *C22C 38/14* (2013.01);
(Continued)

(58) Field of Classification Search
CPC ............ Y10T 428/2991; C01P 2004/80; C01P 2004/84; C01P 2006/42
(Continued)

(56) References Cited

U.S. PATENT DOCUMENTS 5,935,347 A 8/1999 Suzuki et al.
2016/0254082 A1* 9/2016 Tanada .................. C22C 38/002
420/78

(Continued)

FOREIGN PATENT DOCUMENTS

CN 101790765 A * 7/2010 ............ B22F 1/0062
JP 3342767 B2 11/2002
(Continued)

OTHER PUBLICATIONS

Translation CN-101790765 A (Year: 2010).*

*Primary Examiner* — Hoa (Holly) Le
(74) *Attorney, Agent, or Firm* — Faegre Drinker Biddle & Reath LLP

(57) ABSTRACT

Provided is a soft magnetic metal powder including a plurality of soft magnetic metal particles. Each of the soft magnetic metal particles includes a metal particle and an oxidized part covering the metal particle. The metal particle includes at least Fe. The oxidized part includes at least one kind of element of S and an element M. The element M is at least one kind of element selected from the group consisting of Nb, Ta, W, Zr, Hf, and Cr. A unit of a concentration of each of S and the element M in the metal particle and the oxidized part is atom %. The concentration of S or the element M in the metal particle and the oxidized part has a maximum value in the oxidized part.

18 Claims, 5 Drawing Sheets

(51) Int. Cl.
  *C22C 38/12* (2006.01)
  *C22C 38/14* (2006.01)
  *H01F 1/153* (2006.01)
  *B22F 1/16* (2022.01)
  *B22F 9/08* (2006.01)

(52) U.S. Cl.
  CPC ............... *H01F 1/153* (2013.01); *B22F 1/16* (2022.01); *B22F 9/082* (2013.01); *B22F 2301/35* (2013.01); *C01P 2002/00* (2013.01); *C01P 2002/02* (2013.01); *C01P 2004/80* (2013.01); *C01P 2004/84* (2013.01); *C01P 2006/42* (2013.01); *C22C 2202/02* (2013.01)

(58) Field of Classification Search
  USPC .................................................. 428/403–406
  See application file for complete search history.

(56) References Cited

U.S. PATENT DOCUMENTS

| | | | |
|---|---|---|---|
| 2016/0336104 A1* | 11/2016 | Noguchi | ............. C22C 33/0264 |
| 2017/0032880 A1 | 2/2017 | Jeong | |
| 2017/0287605 A1* | 10/2017 | Tanada | ................ H01F 1/14766 |
| 2018/0218811 A1* | 8/2018 | Harada | ............... H01F 1/15325 |
| 2019/0043646 A1 | 2/2019 | Yoshidome et al. | |
| 2021/0035719 A1* | 2/2021 | Mori | ........................ H01F 1/33 |

FOREIGN PATENT DOCUMENTS

| | | | | |
|---|---|---|---|---|
| JP | 2017-034228 A | | 2/2017 | |
| JP | 6460276 B1 | | 1/2019 | |
| WO | WO-2020032031 A1 * | | 2/2020 | ............. C01G 49/06 |

* cited by examiner

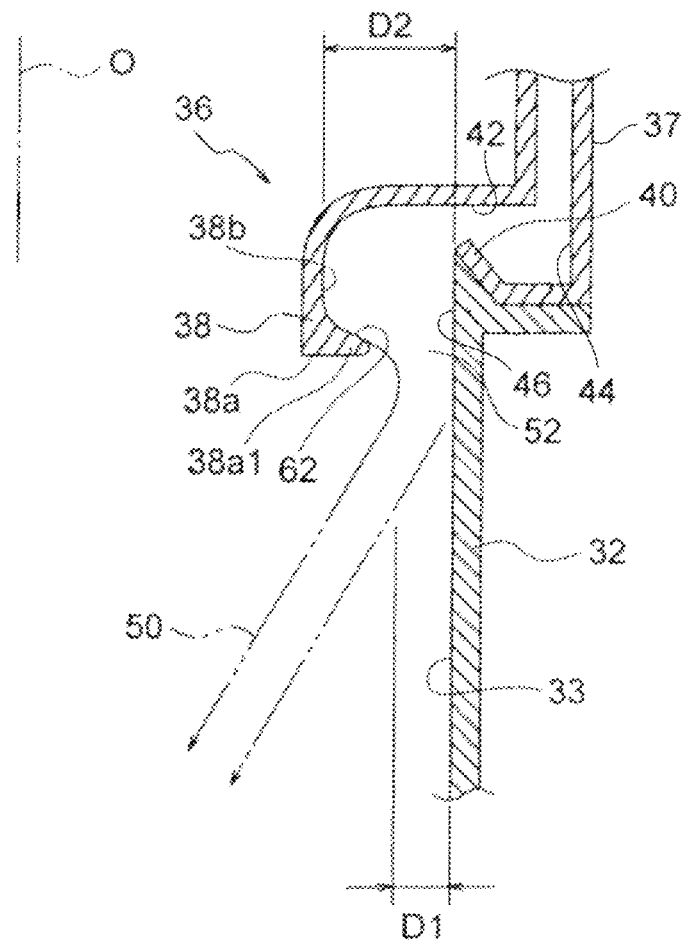

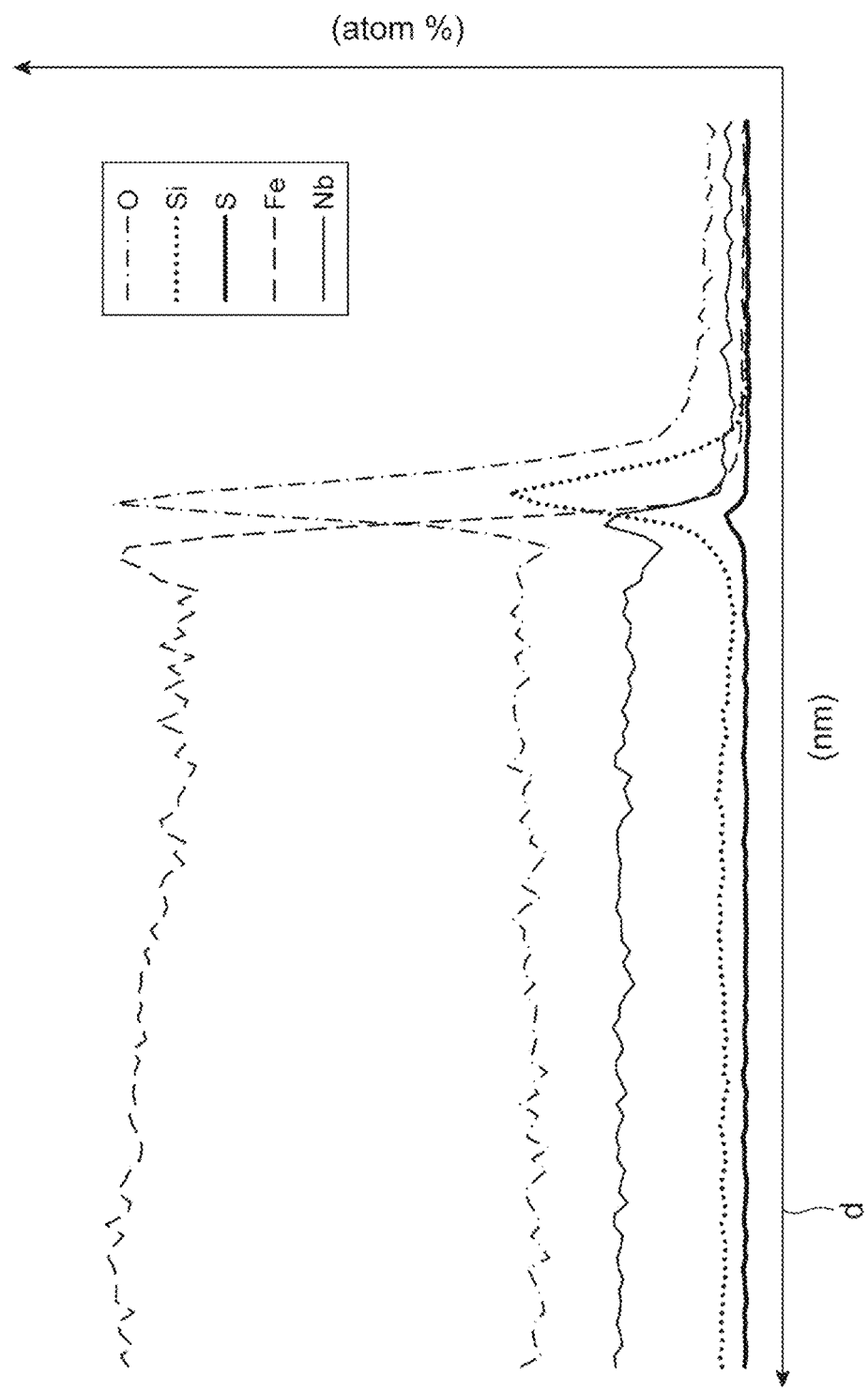

SOFT MAGNETIC METAL POWDER COMPRISING A METAL OXIDE COVERING, AND ELECTRONIC COMPONENT

TECHNICAL FIELD

The present invention relates to a soft magnetic metal powder and an electronic component containing the soft magnetic metal powder.

BACKGROUND

Electronic components such as inductors, transformers, and choke coils are widely used in power supply circuits of various electronic devices. The electronic components include a coil and a magnetic core disposed on an inner side of the coil. Recently, as a material of the magnetic core, a soft magnetic metal powder is widely used instead of ferrite in the conventional art. The reason for this is because the soft magnetic metal powder having higher saturation magnetization (saturation magnetic flux density) than ferrite is excellent in DC superimposition characteristics (DC superimposition permitting current is large), and is suitable for reduction in size of the electronic component (magnetic core) (refer to Japanese Patent No. 3342767.).

However, in a case where the soft magnetic metal powder is used in the magnetic core, an eddy current is likely to occur in a magnetic core due to electrical conduction between a plurality of soft magnetic metal particles included in the soft magnetic metal powder. That is, in a case where the soft magnetic metal powder is used in the magnetic core, a core loss (eddy current loss) is likely to occur. Due to the core loss, efficiency of the power supply circuit decreases, and power consumption of an electronic device increases. Therefore, it is necessary to reduce the core loss. An electrical insulation property between the soft magnetic metal particles is required to reduce the core loss (refer to Japanese Unexamined Patent Publication No. 2017-34228.). In other words, the soft magnetic metal powder is required to have a high withstand voltage so as to reduce the core loss.

SUMMARY

An object of the invention is to provide a soft magnetic metal powder having a high withstand voltage, and an electronic component containing the soft magnetic metal powder.

According to an aspect of the invention, there is provided a soft magnetic metal powder including a plurality of soft magnetic metal particles. Each of the soft magnetic metal particles includes a metal particle and an oxidized part covering the metal particle. The metal particle includes at least Fe. The oxidized part includes at least one kind of element of S and an element M. The element M is at least one kind of element selected from the group consisting of Nb, Ta, W, Zr, Hf, and Cr. A unit of a concentration of each of S and the element M in the metal particle and the oxidized part is atom %. The concentration of S or the element M in the metal particle and the oxidized part has a maximum value in the oxidized part.

An average value of the concentration of the element M in the metal particle is expressed as [M]a, and an average value of the maximum value of the concentration of the element M in the oxidized part is expressed as [M]m, [M]m−[M]a may be 0.4 atom % or more.

[M]m−[M]a may be 5.0 atom % or less.

[M]a may be from 0 atom % to 16.0 atom %, and [M]m may be from 0.4 atom % to 21.0 atom %.

An average value of the concentration of S in the metal particle is expressed as [S]a, and an average value of the maximum value of the concentration of S in the oxidized part is expressed as [S]m, [S]m−[S]a may be 0.2 atom % or more.

[S]m−[S]a may be 5.0 atom % or less.

[S]a may be from 0 atom % to 5.0 atom %, and [S]m may be from 0.2 atom % to 10.0 atom %.

At least a part of the metal particle may be an amorphous phase.

At least a part of the metal particle may be a nanocrystal phase.

The soft magnetic metal particle may further include a coating part covering the oxidized part.

The coating part may include glass.

Both the metal particle and the oxidized part may include at least one kind of element of S and the element M.

According to another aspect of the invention, there is provided an electronic component containing the soft magnetic metal powder.

According to the invention, there are provided a soft magnetic metal powder having a high withstand voltage, and an electronic component containing the soft magnetic metal powder.

BRIEF DESCRIPTION OF THE DRAWINGS

FIG. 4 is a view illustrating an enlarged cross-section of a part (a cooling water introduction part) of the apparatus illustrated in FIG. 3.

FIG. 5 is a graph showing concentration distributions of respective elements in a direction orthogonal to an outermost surface of an oxidized part of the soft magnetic metal particle.

DETAILED DESCRIPTION

Figure 1:
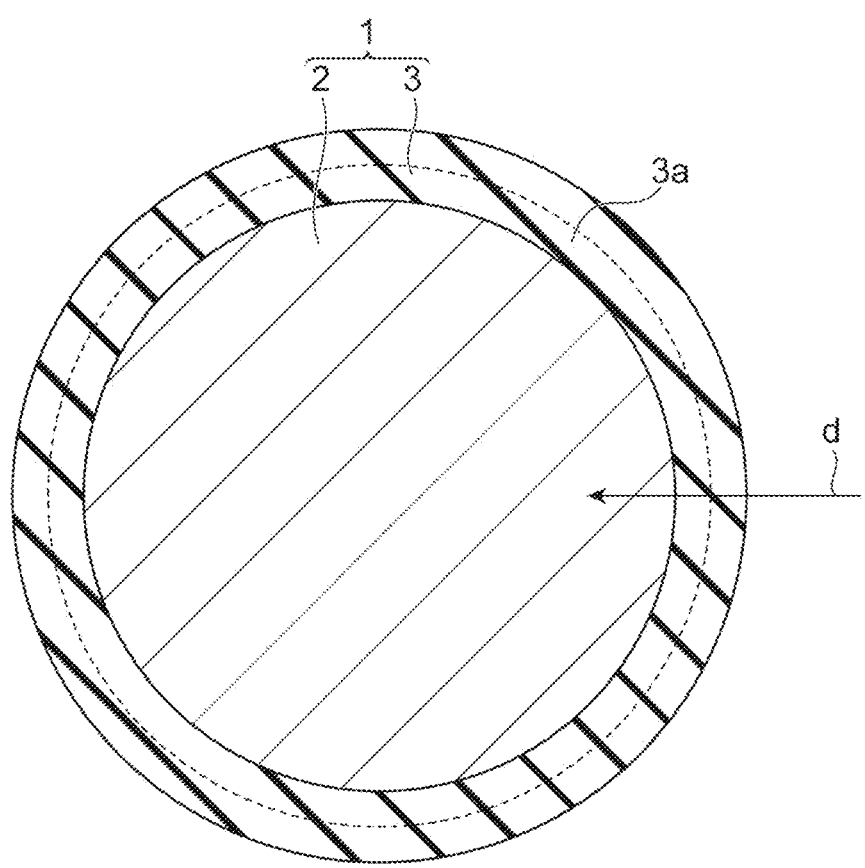
FIG. 1 is a schematic view of a cross-section of a soft magnetic metal particle according to an embodiment of the invention.

Hereinafter, preferred embodiments of the invention will be described with reference to the accompanying drawings. In the drawing, the same reference numeral will be given to an equivalent constituent element. The invention is not limited to the following embodiments.

(Soft Magnetic Metal Powder)

A soft magnetic metal powder according to this embodiment includes a plurality of soft magnetic metal particles. The soft magnetic metal powder may be referred to as the whole of the plurality of soft magnetic metal particles. As illustrated in FIG. 1, a soft magnetic metal particle 1 includes a metal particle 2 and an oxidized part 3 covering the metal particle 2. The soft magnetic metal particle 1 may consist of only the metal particle 2 and the oxidized part 3. The oxidized part 3 may be referred to as an oxidized layer.

Electrical resistance (electrical resistivity) of the oxidized part 3 itself is higher than electrical resistance (electrical resistivity) of the metal particle 2 itself. In other words, the oxidized part 3 has an electrical insulation property. The plurality of soft magnetic metal particles 1 come into contact with each other through the oxidized part 3 having an electrical insulation property, and thus electrical conduction of the soft magnetic metal particles 1 is suppressed. As a result, a withstand voltage of the soft magnetic metal powder increases. That is, the soft magnetic metal powder has a withstand voltage caused by the electrical insulation property of the oxidized part 3. The oxidized part 3 may cover a part or the entirety of the metal particle 2. It is preferable that the oxidized part 3 covers the entirety of the metal particle 2 from the viewpoint that the withstand voltage of the soft magnetic metal powder is likely to increase. The oxidized part 3 may be discontinuous in places. It is preferable that all of the soft magnetic metal particles 1 included in the soft magnetic metal powder include the metal particle 2 and the oxidized part 3 from the viewpoint that the withstand voltage of the soft magnetic metal powder is likely to increase. However, the soft magnetic metal powder may include a small number of metal particles that do not include the oxidized part 3 as long as the withstand voltage of the soft magnetic metal powder is not impaired. Details of a composition of the oxidized part 3 will be described later.

Figure 2:
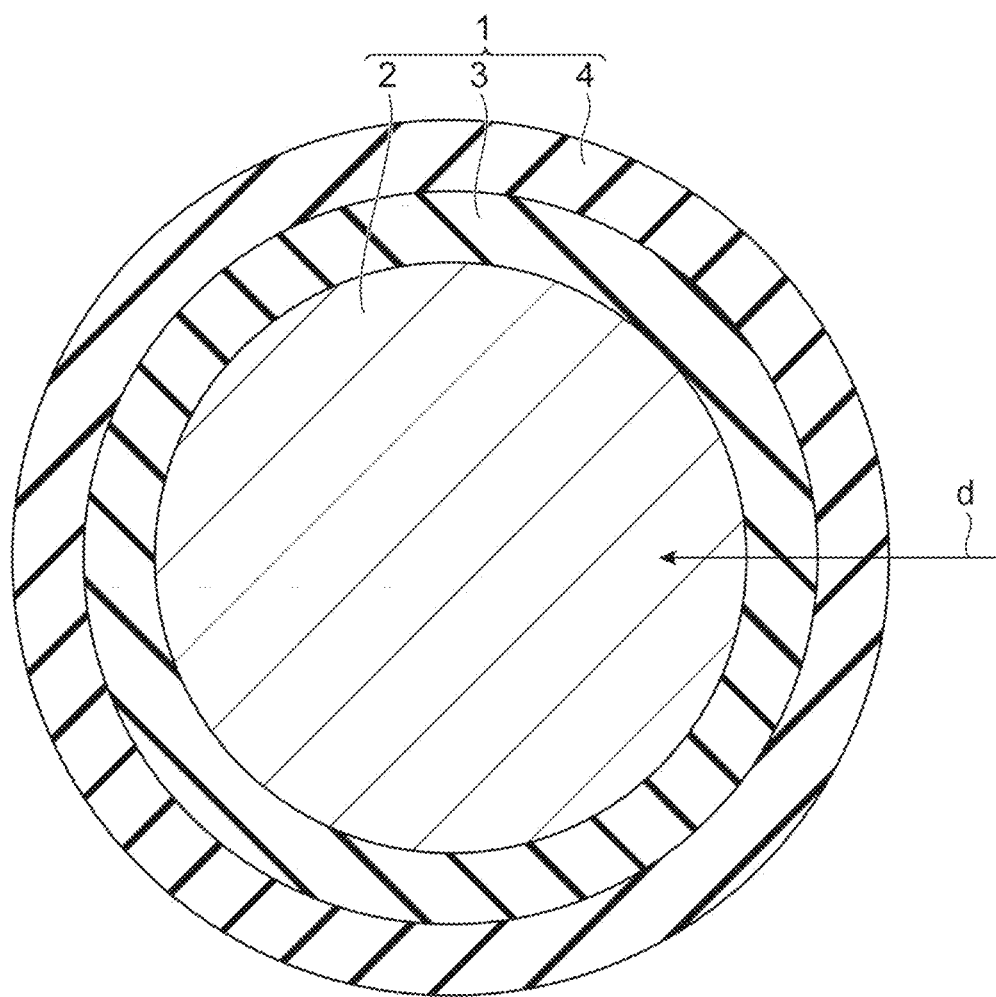
FIG. 2 is a schematic view of a cross-section of a soft magnetic metal particle according to another embodiment of the invention.

As illustrated in FIG. 2, the soft magnetic metal particle 1 may further include a coating part 4 covering the oxidized part 3 in addition to the metal particle 2 and the oxidized part 3. Electrical resistance (electrical resistivity) of the coating part 4 itself is higher than electrical resistance (electrical resistivity) of the metal particle 2 itself. In other words, the coating part 4 has an electrical insulation property. The plurality of soft magnetic metal particles 1 come into contact with each other through the coating part 4 having an electrical insulation property, and thus electrical conduction of the soft magnetic metal particles 1 is further suppressed. As a result, the withstand voltage of the soft magnetic metal powder further increases. The coating part 4 may cover a part or the entirety of the oxidized part 3. It is preferable that the coating part 4 covers the entirety of the oxidized part 3 from the viewpoint that the withstand voltage of the soft magnetic metal powder is likely to increase. In a case where a part of the metal particle 2 is exposed without being covered with the oxidized part 3, the coating part 4 may directly cover the part of the metal particle 2. The coating part 4 may include a plurality of coating layers having compositions different from each other, or a plurality of coating layers may be stacked in a direction orthogonal to an outermost surface of the oxidized part 3. The outermost surface of the oxidized part 3 is a surface that is not contact with the metal particle 2 in the surface of the oxidized part 3. The coating part 4 may be one layer having a uniform composition.

The coating part 4 may include glass. The coating part 4 may consist of only the glass. When the coating part 4 includes the glass, the electrical insulation property of the coating part 4 is likely to be improved, and as a result, the withstand voltage of the soft magnetic metal powder is likely to increase. In addition, when the coating part 4 includes the glass, friction and aggregation between the soft magnetic metal particles 1 are likely to be suppressed, a volume density and a filling rate of the soft magnetic metal powder are likely to increase, and relative magnetic permeability of the entirety of the soft magnetic metal powder is likely to increase. However, the composition of the coating part 4 is not limited to the glass. Details of the composition of the coating part 4 will be described later.

The following "coated particle" represents the soft magnetic metal particle 1 including the coating part 4. The following "uncoated particle" represents the soft magnetic metal particle 1 that does not include the coating part 4.

The soft magnetic metal powder may include both the coated particle and the uncoated particle. The higher a ratio of the number of coated particles occupied in the soft magnetic metal powder is, the higher the withstand voltage of the soft magnetic metal powder is. The ratio of the number of the coated particles occupied in the soft magnetic metal powder may be from 90% to 100%, or may be from 95% to 100%. The soft magnetic metal powder may consist of only the coated particles from the viewpoint that the withstand voltage of the soft magnetic metal powder is likely to increase. However, the soft magnetic metal powder may consist of only uncoated particles.

The following "V1" represents a withstand voltage of a soft magnetic metal powder consisting of only the uncoated particles. The following "V2" represents a withstand voltage of a soft magnetic metal powder including the coated particles. A unit of V1 and V2 is V/mm.

The metal particle 2 includes at least iron (Fe). The metal particle 2 may consist of only Fe. The metal particle 2 may include an alloy including Fe. The metal particle 2 may consist of only an alloy including Fe. Soft magnetic properties of the soft magnetic metal powder result from a composition of the metal particle 2. For example, the soft magnetic properties represent high relative magnetic permeability, high saturation magnetization, and a low coercivity.

Details of the composition of the metal particle 2 will be described later.

The oxidized part 3 includes at least one kind of element of sulfur (S) and an element M. For example, the oxidized part 3 may include an oxide of at least one kind of element between S and the element M. The oxidized part 3 may include only S among S and the element M. The oxidized part 3 may include only the element M among S and the element M. The oxidized part 3 may include both S and the element M. The element M is at least one kind of element selected from the group consisting of niobium (Nb), tantalum (Ta), tungsten (W), zirconium (Zr), hafnium (Hf), and chromium (Cr). The oxidized part 3 may include a plurality of kinds of elements M. The oxidized part 3 may further include an oxide of at least one kind of element selected from the group consisting of Fe, silicon (Si), and boron (B). The oxidized part 3 may further include at least one kind of Group 1 element (alkali metal) selected from the group consisting of lithium (Li), sodium (Na), and potassium (K). The oxidized part 3 may further include at least one kind of Group 2 element (or alkali earth metal) selected from the group consisting of beryllium (Be), magnesium (Mg), calcium (Ca), strontium (Sr), and barium (Ba). In a case where the oxidized part 3 includes at least one kind of Mg and Ca, the withstand voltage of the soft magnetic metal powder is more likely to increase. The oxide may be a main component of the oxidized part 3. The oxidized part 3 may consist of only the oxide.

A concentration of S or the element M in the metal particle 2 and the oxidized part 3 is maximum in the oxidized part 3. That is, a concentration distribution of S or the element M in the metal particle 2 and the oxidized part 3 is not constant, and has a maximum value at an arbitrary site belonging to the oxidized part 3. A unit of the concentration of S and the element M in the metal particle 2 and the oxidized part 3 is atom %. In a case where the oxidized part 3 (or both the metal particle 2 and the oxidized part 3) includes a plurality of kinds of elements M, a "concentration of the element M" represents the sum of concentrations of a total kinds of elements M. A maximum value of the concentration of S in the oxidized part 3 may be an absolute maximum value of the concentration of S in the metal particle 2 and the oxidized part 3. A maximum value of the concentration of the element M in the oxidized part 3 may be an absolute maximum value of the concentration of M in the metal particle 2 and the oxidized part 3. When the concentration of S or the element M in the metal particle 2 and the oxidized part 3 is maximum in the oxidized part 3, the oxidized part 3 can have an excellent electrical insulation property. As a result, the soft magnetic metal powder can have a high withstand voltage. The concentration of S in the metal particle 2 and the oxidized part 3 may be maximum in the oxidized part 3, and the concentration of the element M in the metal particle 2 and the oxidized part 3 may also be maximum in the oxidized part 3. The concentration of S in the metal particle 2 and the oxidized part 3 may be maximum in the oxidized part 3, and the concentration of the element M in the metal particle 2 and the oxidized part 3 may not be maximum in the oxidized part 3. The concentration of S in the metal particle 2 and the oxidized part 3 may not be maximum in the oxidized part 3, and the concentration of the element M in the metal particle 2 and the oxidized part 3 may be maximum in the oxidized part 3. Both the metal particle 2 and the oxidized part 3 may include at least one element of S and the element M. For example, both the metal particle 2 and the oxidized part 3 may include S. Both the metal particle 2 and the oxidized part 3 may include the common element M. Both the metal particle 2 and the oxidized part 3 may include both S and the element M. In the metal particle 2 and the oxidized part 3, only the oxidized part 3 may include at least one element of S and the element M. From the viewpoint that the withstand voltage of the soft magnetic metal powder is likely to increase, it is preferable that the concentration of S or the element M is maximum in the oxidized part 3 of all of a plurality of the soft magnetic metal particles 1 included in the soft magnetic metal powder. However, the soft magnetic metal powder may include a small number of metal particles in which the concentration of S or the element M is maximum in a portion other than the oxidized part 3 as long as the withstand voltage of the soft magnetic metal powder is not impaired.

An average value of the concentration of S in the metal particle 2 is expressed as [S]a. An average value of the maximum value of the concentration of S in the oxidized part 3 is expressed as [S]m. [S]a may be from 0 atom % to 5.0 atom %, or from 0 atom % to 3.5 atom %, and [S]m may be from 0.2 atom % to 10.0 atom %, from 0.2 atom % to 9.0 atom %, or from 0.2 atom % to 7.0 atom %. In a case where the concentration of the element M in the metal particle 2 and the oxidized part 3 has the maximum value in the oxidized part 3, [S]m may be from 0 atom % to 10.0 atom %, from 0 atom % to 9.0 atom %, or from 0 atom % to 7.0 atom %. [S]m−[S]a may be 0.2 atom % or more. The following Δ[S] represents [S]m−[S]a. There is a tendency that a withstand voltage (V1 and V2) of a soft magnetic metal powder in which Δ[S] is 0.2 atom % or more is higher than a withstand voltage of a soft magnetic metal powder in which Δ[S] is less than 0.2 atom %. From the same reason, Δ[S] may be from 0.2 atom % to 5.0 atom %, or from 0.5 atom % to 3.6 atom %.

An average value of the concentration of the element M in the metal particle 2 is expressed as [M]a. An average value of the maximum value of the concentration of the element M in the oxidized part 3 is expressed as [M]m. [M]a may be from 0 atom % to 16.0 atom %, or from 0 atom % to 15.0 atom %, and [M]m may be from 0.4 atom % to 21.0 atom %, from 0.4 atom % to 20.0 atom %, or from 0.4 atom % to 17.0 atom %. In a case where the concentration of S in the metal particle 2 and the oxidized part 3 has the maximum value in the oxidized part 3, [M]m may be from 0 atom % to 21.0 atom %, from 0 atom % to 20.0 atom %, or from 0 atom % to 17.0 atom %. [M]m−[M]a may be 0.4 atom % or more. The following Δ[M] represents [M]m−[M]a. There is a tendency that a withstand voltage (particularly, V2) of a soft magnetic metal powder in which Δ[M] is 0.4 atom % or more is higher than a withstand voltage of a soft magnetic metal powder in which Δ[M] is less than 0.4 atom %. From the same reason, Δ[M] may be from 0.4 atom % to 5.0 atom %, or from 0.5 atom % to 3.1 atom %.

From the viewpoint that the withstand voltage (particularly, V2) of the soft magnetic metal powder is more likely to increase, it is preferable that both Δ[S] and Δ[M] are 0.5 atom % or more. However, only one value of Δ[S] and Δ[M] may be 0.5 atom % or more, and the other value of Δ[S] and Δ[M] may be less than 0.5 atom %. Even in a case where only one value of Δ[S] and Δ[M] is 0.5 atom % or more, and the other value of Δ[S] and Δ[M] is less than 0.5 atom %, the withstand voltage of the soft magnetic metal powder can be increased.

The concentration of each of S and the element M in the metal particle 2 and oxidized part 3 may be measured by ray analysis to be described below.

Twenty soft magnetic metal particles 1 are randomly selected from the soft magnetic metal powder. A concentration distribution of each of S and the element M in the metal particle 2 and the oxidized part 3 of each of the soft magnetic metal particles 1 is measured. A site at which the concentration of each of S and the element M is maximum is specified on the basis of the concentration distribution that is measured. The concentration distribution of each of S and the element M is measured at a cross-section of the soft magnetic metal particle 1 in a direction orthogonal to an outermost surface of the oxidized part 3. That is, the concentration distribution of each of S and the element M is measured along a direction orthogonal to the outermost surface of the oxidized part 3. The direction orthogonal to the outermost surface of the oxidized part 3 is a depth direction d illustrated in FIG. 1. Accordingly, the concentration distribution of each of S and the element M may be referred to as a concentration distribution of each of S and the element M along a line segment extending in the depth direction d. The line segment extending in the depth direction d may be a line segment that connects the center of the metal particle 2 and the outermost surface of the oxidized part 3. The line segment extending in the depth direction d may be a line segment that crosses the entirety of the metal particle 2 and the oxidized part 3. Measurement means of the concentration distribution of each of S and the element M may be energy dispersive X-ray spectroscopy (EDS). For example, a cross-section analyzed by the EDS may be observed by a scanning transmission electron microscope (STEM).

The average value ([S]m) of the maximum value of the concentration of S is calculated from the maximum value of the concentration of S which is measured in the oxidized part 3 of each of the twenty soft magnetic metal particles 1. The average value ([M]m) of the maximum value of the concentration of the element M is calculated from the maximum value of the concentration of the element M which is measured in the oxidized part 3 of each of the twenty soft magnetic metal particles 1.

To calculate [S]a and [M]a, the concentration of each of S and the element M at arbitrary twenty sites located inside the metal particle 2 of the each soft magnetic metal particle 1 is measured. The average value of the concentration of S in the metal particle 2 of the each soft magnetic metal particle 1 is calculated from the concentration of S which is measured at the twenty sites. [S]a is calculated from the average value of the concentration of S which is measured in the metal particle 2 of each of the twenty soft magnetic metal particles 1. As in the concentration of S, the average value of the concentration of the element M in the metal particle 2 of the each soft magnetic metal particle 1 is calculated from the concentration of the element M which is measured at the twenty sites. [M]a is calculated from the average value of the concentration of the element M which is measured in the metal particle 2 of each of the twenty soft magnetic metal particles 1.

A concentration distribution of another element included in the soft magnetic metal particle 1 may be measured by the same method as in the concentration distribution of each of S and the element M.

The metal particle 2 and the oxidized part 3 may be identified on the basis of a concentration of oxygen (O). For example, an average value ([O]a) of the concentration of O in the metal particle 2 is calculated in the same method as in [S]a and [M]a. In an outer peripheral portion of a cross-section of the soft magnetic metal particle 1, a region in which the concentration of oxygen is higher than [O]a may be regarded as the oxidized part 3.

An inner region 3a illustrated in FIG. 1 is a part of the oxidized part 3, and is defined as a region in which a distance from the outermost surface of the oxidized part 3 is more than the half of the thickness of the oxidized part 3. The concentration of S or the element M in the metal particle 2 and the oxidized part 3 may be maximum in the inner region 3a. A soft magnetic metal powder in which the concentration of S or the element M in the inner region 3a is maximum is likely to have a high withstand voltage regardless of presence or absence of the coating part 4. From the same reason, the concentration of S or the element M in the metal particle 2 and the oxidized part 3 may be maximum at an interface between the metal particle 2 and the oxidized part 3. The interface between the metal particle 2 and the oxidized part 3 may be regarded as belonging to the oxidized part 3.

In the oxidized part 3, a site at which the concentration of S or the element M is maximum may be different from a site at which a concentration of another element is maximum in the oxidized part 3. In other words, concentration distributions of respective elements included in the oxidized part 3 may be different from each other, and the composition of the oxidized part 3 may be non-uniform. For example, a part of the oxidized part 3 may be an oxide of S or the element M, or another part of the oxidized part 3 may be an oxide of another element (for example, Fe or Si). A soft magnetic metal powder in which concentration distribution of respective elements included in the oxidized part 3 is different from each other is likely to have a high withstand voltage.

At least a part of the metal particle 2 may be an amorphous phase. The metal particle 2 may consist of only the amorphous phase. That is, the entirety of the metal particle 2 may be the amorphous phase. The soft magnetic metal particle 1 including the amorphous phase has more excellent soft magnetic characteristics than a soft magnetic metal particle constituted by a coarse crystal phase in the conventional art. For example, the soft magnetic metal particle 1 including an amorphous phase can have higher saturation magnetization and a lower coercivity than the soft magnetic metal particle in the conventional art. Examples of the coarse crystal phase included in the soft magnetic metal particle in the conventional art include a crystal having a grain size or a crystallite size more than 30 nm. As a volume ratio of the amorphous phase occupied in the metal particle 2 increases, crystalline magnetic anisotropy of the soft magnetic metal particle 1 is reduced, and thus a magnetic loss (hysteresis loss) of a magnetic core formed from the soft magnetic metal particle 1 is reduced.

At least a part of the metal particle 2 may be a crystalline phase. The entirety of the metal particle 2 may be the crystalline phase. The metal particle 2 may include both the crystalline phase and the amorphous phase. At least a part of the metal particle 2 may be a nanocrystal phase. The nanocrystal may be a crystal of Fe simple substance or a crystal of an alloy including Fe. The entirety of the metal particle 2 may be the nanocrystal phase. The soft magnetic metal particle 1 including the nanocrystal phase has more excellent soft magnetic characteristics than a soft magnetic metal particle that does not include the nanocrystal phase and includes the amorphous phase. For example, the soft magnetic metal particle 1 including the nanocrystal phase can have higher saturation magnetization and a lower coercivity than a soft magnetic metal particle that does not include the nanocrystal phase and includes the amorphous phase. The metal particle 2 may include a plurality of nanocrystal phases. The metal particle 2 may consist of only the plurality of nanocrystal phase. The metal particle 2 may consist of only one nanocrystal phase. A crystal structure of the nanocrystal phase may be, for example, a body-centered cubic lattice structure. For example, a grain size (average crystallite size) of the nanocrystal phase may be 5 nm to 30 nm.

From the viewpoint that the soft magnetic metal powder is likely to have excellent soft magnetic characteristics, it is preferable that the metal particle 2 includes at least one of the amorphous phase and the nanocrystal phase. From the same reason, the metal particle 2 may include both the amorphous phase and the nanocrystal phase. For example, the metal particle 2 may have a nanohetero structure consisting of the amorphous phase and a plurality of the nanocrystal phases dispersed in the amorphous phase. In a case where the metal particle 2 has the nanohetero structure, saturation magnetization of a soft magnetic metal powder is likely to increase, and a coercivity of the soft magnetic metal powder is likely to decrease. For example, a grain size (average crystallite size) of the nanocrystal phases included in the nanohetero structure may be from 5 nm to 30 nm, or from 0.3 nm to 10 nm.

The metal particle 2 may not include the amorphous phase and the nanocrystal phase. For example, a part or the entirety of the metal particle 2 may be one or more coarse crystal phases.

The metal particle 2 may be an alloy including at least one kind of element selected from the group consisting of niobium (Nb), hafnium (Hf), zirconium (Zr), tantalum (Ta), molybdenum (Mo), tungsten (W), vanadium (V), boron (B), phosphorus (P), silicon (Si), carbon (C), sulfur (S), titanium (Ti), cobalt (Co), nickel (Ni), aluminum (Al), manganese (Mn), silver (Ag), zinc (Zn), tin (Sn), arsenic (As), antimony (Sb), copper (Cu), chromium (Cr), bismuth (Bi), nitrogen (N), oxygen (O), and rare earth elements in addition to Fe.

The metal particle 2 may include an alloy expressed by the following Chemical Formula 1. The metal particle 2 may consist of only the alloy expressed by the following Chemical Formula 1.

$$(Fe_{(1-(\alpha+\beta))}X1_\alpha X2_\beta)_{(1-h)}M'_a B_b P_c Si_d C_e S_f \quad (1)$$

B in Chemical Formula 1 described above is boron. P in Chemical Formula 1 described above is phosphorus. Si in Chemical Formula 1 described above is silicon. C in Chemical Formula 1 described above is carbon. S in Chemical Formula 1 described above is sulfur. h in Chemical Formula 1 described above is equal to a+b+c+d+e+f. h is more than 0 and less than 1.

M' in Chemical Formula 1 described above is at least one kind of element selected from the group consisting of Nb, Hf, Zr, Ta, Mo, W, Ti, and V. A part or the entirety of the element M' in Chemical Formula 1 described above may be common to a part or the entirety of the element M included in the oxidized part 3. That is, a part or the entirety of the element M' included in the metal particle 2 may be common to a part or the entirety of the element M included in the oxidized part 3.

X1 in Chemical Formula 1 described above is at least one kind of element selected from the group consisting of Co and Ni.

X2 in Chemical Formula 1 described above is at least one kind of element selected from the group consisting of Al, Mn, Ag, Zn, Sn, As, Sb, Cu, Cr, Bi, N, O, and a rare earth element. The rare earth element is at least one kind of element selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). A part or the entirety of the element X2 in Chemical Formula 1 described above may be Cr, and a part or the entirety of the element M included in the oxidized part 3 may be Cr. That is, a part or the entirety of the element X2 included in the metal particle 2 may be Cr, and a part or the entirety of the element M included in the oxidized part 3 may be Cr.

a in Chemical Formula 1 described above may satisfy the following inequalities.

$$0.020 \leq a \leq 0.140,$$

$$0.040 \leq a \leq 0.100, \text{ or}$$

$$0.050 \leq a \leq 0.080.$$

In a case where a is excessively small, in a process of producing a soft magnetic metal powder, a coarse crystal having a grain size more than 30 nm is likely to precipitate in the metal particle 2, and a fine nanocrystal phase is less likely to precipitate in the metal particle 2. As a result, a coercivity of the soft magnetic metal powder is likely to increase. In a case where a is excessively large, saturation magnetization of the soft magnetic metal powder is likely to decrease.

b in Chemical Formula 1 described above may satisfy the following inequalities.

$$0 \leq b \leq 0.20,$$

$$0 \leq b \leq 0.20,$$

$$0.020 \leq b \leq 0.20,$$

$$0.020 \leq b \leq 0.20,$$

$$0.025 \leq b \leq 0.20,$$

$$0.060 \leq b \leq 0.15, \text{ or}$$

$$0.080 \leq b \leq 0.12.$$

In a case where b is excessively small, in a process of producing the soft magnetic metal powder, a coarse crystal having a grain size more than 30 nm is likely to precipitate in the metal particle 2, and a fine nanocrystal phase is less likely to precipitate in the metal particle 2. As a result, the coercivity of the soft magnetic metal powder is likely to increase. In a case where b is excessively large, the saturation magnetization of the soft magnetic metal powder is likely to decrease.

c in Chemical Formula 1 described above may satisfy the following inequalities.

$$0 \leq c \leq 0.15,$$

$$0 < c \leq 0.15,$$

$$0.005 \leq c \leq 0.100, \text{ or}$$

$$0.010 \leq c \leq 0.100.$$

In a case where c satisfies $0.005 \leq c \leq 0.100$, electrical resistivity of the soft magnetic metal powder is likely to increase, and the coercivity is likely to decrease. In a case where c is excessively small, the coercivity is likely to increase. In a case where c is excessively large, the saturation magnetization of the soft magnetic metal powder is likely to decrease.

d in Chemical Formula 1 described above may satisfy the following inequalities.

$$0 \leq d \leq 0.175,$$

$$0 \leq d \leq 0.155,$$

$$0 \leq d \leq 0.150,$$

$$0 \leq d \leq 0.135,$$

$$0 \leq d \leq 0.100,$$

$$0 \leq d \leq 0.090,$$

$$0 \leq d \leq 0.060,$$

$$0.001 \leq d \leq 0.040, \text{ or}$$

$$0.005 \leq d \leq 0.040.$$

In a case where d is within the above-described ranges, the coercivity of the soft magnetic metal powder is likely to decrease. In a case where d is excessively large, the coercivity of the soft magnetic metal powder is likely to increase.

e in Chemical Formula 1 described above may satisfy the following inequalities.

$$0 \leq e \leq 0.150,$$

$$0 \leq e \leq 0.080,$$

$$0 \leq e \leq 0.040,$$

$$0 \leq e \leq 0.035,$$

$$0 \leq e \leq 0.030, \text{ or}$$

$$0.001 \leq e \leq 0.030.$$

In a case where e is within the above-described ranges, the coercivity of the soft magnetic metal powder is likely to decrease. In a case where e is excessively large, the coercivity of the soft magnetic metal powder is likely to increase.

f in Chemical Formula 1 described above may satisfy the following inequalities.

$0 \leq f \leq 0.030$, $0 \leq f \leq 0.010$, $0 < f \leq 0.010$, $0.001 \leq f \leq 0.010$, or $0.002 \leq f \leq 0.010$.

In a case where f is within the above-described ranges, the coercivity of the soft magnetic metal powder is likely to decrease. In a case where f is excessively large, the coercivity of the soft magnetic metal powder is likely to increase. In a case where f is more than 0 (in a case where f is 0.001 or more), the sphericity of each soft magnetic metal particle is high, and a density (filling rate) of a magnetic core produced through compression molding of the soft magnetic metal powder is likely to increase, and the relative magnetic permeability of the magnetic core is likely to increase.

1−h in Chemical Formula 1 described above may satisfy the following inequalities.

$0.690 \leq 1-h \leq 0.95$ or $0.690 \leq 1-h \leq 0.900$.

In a case where 1−h satisfies $0.690 \leq 1-h \leq 0.95$, in a process of producing the soft magnetic metal powder, a coarse crystal having a grain size more than 30 nm is less likely to precipitate in the metal particle 2.

α and h in Chemical Formula 1 described above may satisfy the following inequalities.

$0 \leq \alpha(1-h) \leq 0.40$ or $0.01 \leq \alpha(1-h) \leq 0.40$.

β and h in Chemical Formula 1 described above may satisfy the following inequalities.

$0 \leq \beta(1-h) \leq 0.050$, $0.001 \leq \beta(1-h) \leq 0.050$, $0 \leq \beta(1-h) \leq 0.030$, or $0.001 \leq \beta(1-h) \leq 0.030$.

α+β in Chemical Formula 1 described above may satisfy $0 \leq \alpha+\beta \leq 0.50$. In a case where α+β is excessively large, a fine nanocrystal phase is less likely to precipitate in the metal particle 2.

The composition of the coating part 4 is not limited as long as the coating part 4 electrically insulates the soft magnetic metal particles 1 from each other. For example, the coating part 4 may include at least one kind of element selected from the group consisting of phosphorus (P), silicon (Si), bismuth (Bi), zinc (Zn), sodium (Na), magnesium (Mg), calcium (Ca), strontium (Sr), barium (Ba), boron (B), aluminum (Al), indium (In), carbon (C), germanium (Ge), lead (Pb), arsenic (As), antimony (Sb), oxygen (O), sulfur (S), selenium (Se), tellurium (Te), fluorine (F), chlorine (Cl), bromine (Br), titanium (Ti), vanadium (V), chromium (Cr), iron (Fe), cobalt (Co), nickel (Ni), copper (Cu), zirconium (Zr), molybdenum (Mo), and tungsten (W). It is preferable that the coating part 4 includes a compound including at least one element A selected from the group consisting of P, Si, Bi, and Zn. The compound including at least one element A selected from the group consisting of P, Si, Bi, and Zn is noted as "compound A". For example, the compound A may be a compound including P. The compound A may be an oxide (preferably, oxide glass). These compounds A are likely to bond with an element (particularly, P or Si) included in the metal particle 2 and the oxidized part 3. Particularly, the compound A is likely to bond with an element (particularly, P or Si) segregated in an amorphous phase of the metal particle 2. As a result, the coating part 4 is likely to be in close contact with the oxidized part 3, and the withstand voltage of the soft magnetic metal powder is likely to increase.

The compound A may be a main component of the coating part 4. In other words, in a case where the total mass of all elements (excluding oxygen) included in the coating part 4 is 100 parts by mass, a total mass of the element A may be from 50 parts by mass to 100 parts by mass, or from 60 parts by mass to 100 parts by mass. The coating part 4 may consist of only the compound A.

In a case where the coating part 4 includes oxide glass, the oxide glass may be at least one kind of glass selected from the group consisting of phosphate-based glass ($P_2O_5$-based glass), bismuthate-based glass ($Bi_2O_3$-based glass), silicate-based glass ($SiO_2$-based glass), and borosilicate-based glass ($B_2O_3$—$SiO_2$-based glass).

The content of $P_2O_5$ in the $P_2O_5$-based glass may be from 50% by mass to 100% by mass. For example, the $P_2O_5$-based glass may be $P_2O_5$—$ZnO$—$R_2O$—$Al_2O_3$-based glass. R is an alkali metal.

The content of $Bi_2O_3$ in $Bi_2O_3$-based glass may be from 50% by mass to 100% by mass. For example, the $Bi_2O_3$-based glass may be $Bi_2O_3$—$ZnO$—$B_2O_3$—$SiO_2$-based glass.

The content of $B_2O_3$ in the $B_2O_3$—$SiO_2$-based glass may be from 10% by mass to 90% by mass, and the content of $SiO_2$ in the $B_2O_3$—$SiO_2$-based glass may be from 10% by mass to 90% by mass.

For example, the $B_2O_3$—$SiO_2$-based glass may be $BaO$—$ZnO$—$B_2O_3$—$SiO_2$—$Al_2O_3$-based glass.

For example, a median diameter (D50) of the soft magnetic metal powder may be from 0.3 μm to 100 μm. D50 may be specified on the basis of a number-based particle size distribution of the soft magnetic metal powder. The soft magnetic metal powder may be a mixture of two or more kinds of metal powders different in a particle size or a particle size distribution. The particle size and the particle size distribution of the soft magnetic metal powder may be adjusted by sieving classification, airflow classification, or the like. For example, the particle size and the particle size distribution of the soft magnetic metal powder may be measured by a laser diffraction scattering method. From the viewpoint that a volume density and relative magnetic permeability of the soft magnetic metal powder are likely to increase, a shape of each soft magnetic metal particle 1 may be approximately spherical. However, the shape of the soft magnetic metal particle 1 is not limited. For example, the thickness of the oxidized part 3 may be from 1.0 nm to 20 nm. For example, the thickness of the coating part 4 may be from 5 nm to 200 nm, from 5 nm to 150 nm, or from 5 nm to 50 nm.

A structure, dimensions, and a composition of each of the metal particle 2, the oxidized part 3, and the coating part 4 may be analyzed by a method such as scanning transmission electron microscope (STEM), transmission electron microscope (TEM), energy dispersive X-ray spectroscopy (EDS), electron energy loss spectroscopy (EELS), fast Fourier transform (FFT) analysis of TEM images, and a powder X-ray diffraction (XRD) method.

(Method for Producing Soft Magnetic Metal Powder)

The soft magnetic metal powder according to this embodiment can be produced by a gas atomizing method. Details of the gas atomizing method are as follows.

In the gas atomizing method, a metal raw material is melted to form a molten metal, a high-pressure gas is sprayed to the molten metal to form liquid droplets, and the liquid droplets are rapidly cooled with cooling water to form metal fine particles (fine powders). After the gas atomizing method, a heat treatment on the fine powders is further performed to form a soft magnetic metal powder (uncoated particles).

Figure 3:
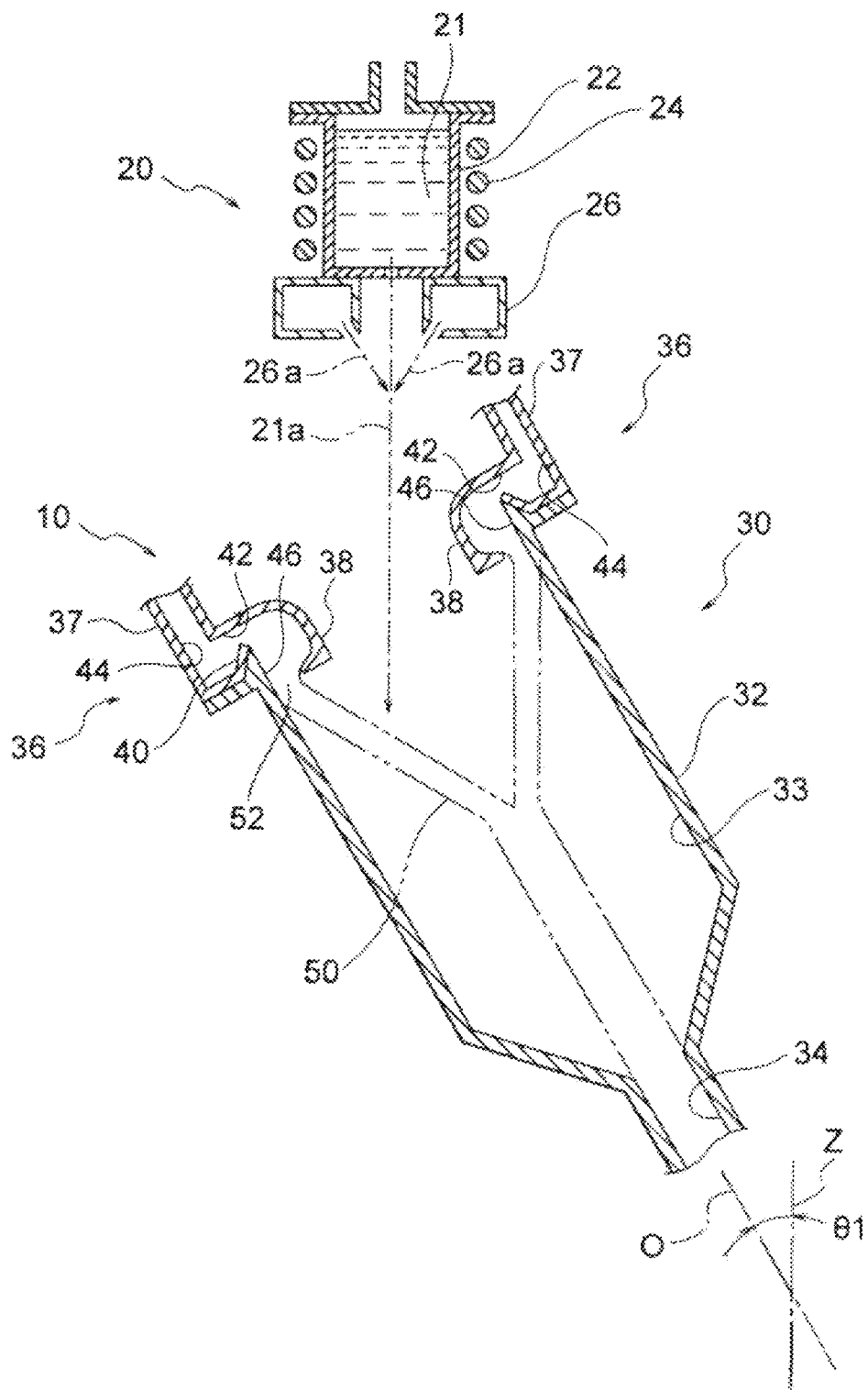
FIG. 3 is a schematic view of a cross-section of a gas atomizing apparatus that is used in production of a soft magnetic metal powder.

The gas atomizing method may be carried out by using a gas atomizing apparatus 10 illustrated in FIG. 3. The gas atomizing apparatus 10 includes a supply unit 20 and a cooling unit 30 disposed on a downward side of the supply unit 20. A Z-axis direction in FIG. 3 is a vertical direction.

The supply unit 20 includes a heat-resistant container 22, and a coil 24 (heating device) disposed at the periphery of the container 22. As a raw material of the soft magnetic metal powder, a metal raw material is contained in the container 22.

The metal raw material includes at least one kind of element of S and an element M, and Fe. The metal raw material may be an alloy. A composition of the metal raw material may be a composition expressed by Chemical Formula 1 described above. A mixture of a plurality of kinds of metal raw materials may be used. In the case of using the plurality of kinds of metal raw materials, each of the metal raw materials may be weighed so that a composition of the entirety of the plurality of kinds of metal raw materials matches Chemical Formula 1 described above. The metal raw material may include inevitable impurities. The content of the inevitable impurities in all of the metal raw materials may be 0% by mass to 0.1% by mass. A form of the metal raw material may be, for example, an ingot, a chunk (lump), or a shot (particle). In a case where the oxidized part 3 including S is formed, S included in the oxidized part 3 may be derived from S included in the metal raw material. In a case where the oxidized part 3 including the element M is formed, the element M included in the oxidized part 3 may be derived from at least one kind of element of an element M' and Cr included in the metal raw material. That is, the metal raw material may include at least one kind of element M selected from the group consisting of Nb, Ta, W, Zr, Hf, and Cr as the element M' or the element X2 in Chemical Formula 1 described above.

The metal raw material in the container 22 is heated by the coil 24. As a result, the metal raw material in the container 22 is melted, and becomes a molten metal 21. A temperature of the molten metal 21 may be adjusted in correspondence with a melting point of metals included in the metal raw material. For example, the temperature of the molten metal 21 may be from 1200° C. to 1500° C.

The molten metal 21 is supplied dropwise from an ejection port of the container 22 toward the cooling unit 30. In addition, a high-pressure gas 26a is sprayed from a gas nozzle 26 to the molten metal 21. As a result, a plurality of fine liquid droplets 21a are formed from the molten metal 21. The liquid droplets 21a move to the inside of a tubular body 32 of the cooling unit 30 in accordance with the high-pressure gas 26a. For example, an atmosphere inside the tubular body 32 may be vacuum.

The high-pressure gas sprayed to the molten metal 21 may be, for example, an inert gas or a reducing gas. For example, the inert gas may be at least one kind of gas selected from the group consisting of nitrogen ($N_2$), argon (Ar), and helium (He). For example, the reducing gas may be an ammonia decomposition gas. In a case where the molten metal 21 consists of a metal that is not easily oxidized, the high-pressure gas may be air.

When the cooling water is supplied from an introduction part 36 to the inside of the tubular body 32, a water flow 50 is formed inside the tubular body 32. A shape of the water flow 50 is an inverted cone. When the liquid droplet 21a collides with the inverted conical water flow 50, the liquid droplet 21a is decomposed into finer liquid droplets. The fine liquid droplets are rapidly cooled by the water flow 50, and are solidified.

Due to the rapid cooling of the liquid droplets as described above, a fine powder including a plurality of metal fine particles is formed. A composition of the fine powder approximately matches a composition (for example, Chemical Formula 1 described above) of the entirety of raw material metals.

As described above, since the inverted conical water flow 50 is formed inside the tubular body 32, movement time of the liquid droplet 21a in the air is further shortened in comparison to a case where a water flow is formed along an inner wall of the tubular body 32. That is, time required for the liquid droplet 21a to reach the water flow 50 from the container 22 is shortened. Due to shortening of the movement time of the liquid droplet 21a in the air, rapid cooling of the liquid droplet 21a is promoted, and thus an amorphous phase is likely to be formed in the obtained metal fine particles. In addition, due to shortening of the movement time of the liquid droplet 21a in the air, oxidization of the liquid droplet 21a during movement is suppressed. As a result, the liquid droplet 21a is likely to be decomposed into fine liquid droplets in the water flow 50, and the quality of a finally obtained soft magnetic metal powder is improved.

An angle between a central axial line O of the tubular body 32 and the Z-axis direction is expressed as $\theta 1$. For example, $\theta 1$ may be from 0° to 45°. When $\theta 1$ is from 0° to 45°, the liquid droplet 21a easily comes into contact with the inverted conical water flow 50.

A discharge part 34 is provided on a downward side of the tubular body 32. The cooling water including the fine powder is discharged from the discharge part 34 to the outside of the tubular body 32. The cooling water discharged from the discharge part 34 may be contained, for example, in a storage tank. In the storage tank, the fine powder settles to the bottom of the storage tank due to weight of the fine powder. As a result, the fine powder is separated from the cooling water.

In the gas atomizing method, since the liquid droplet 21a is rapidly cooled by the cooling water, an amorphous phase is likely to be formed in metal fine particles. Amorphousness and a shape of the metal fine particles may be controlled by a temperature of the cooling water supplied to the cooling unit 30 (tubular body 32), a shape of the water flow 50, a flow rate of the cooling water, or a flow amount of the cooling water.

FIG. 4 is an enlarged view of the cooling water introduction part 36 illustrated in FIG. 3. The inverted conical water flow 50 is formed inside the tubular body 32, and thus flow of the cooling water is controlled by a structure of the introduction part 36.

As illustrated in FIG. 4, a space surrounded by a frame 38 is partitioned into an outer part 44 and an inner part 46 by a boundary part 40. The outer part 44 (outer space part) is located on an outer side of the tubular body 32. The inner part 46 (inner space part) is located on an inner side of the tubular body 32. The outer part 44 and the inner part 46 communicate with each other through a passage part 42. One or a plurality of nozzles 37 communicate with the outer part 44. The cooling water is supplied from the nozzle 37 to the outer part 44, and flows from the outer part 44 to the inner part 46 through the passage part 42. An ejection part 52 is formed on a downward side of the inner part 46. The cooling water in the inner part 46 is supplied from the ejection part 52 to the inside of the tubular body 32.

An outer peripheral surface of the frame 38 is a flow passage surface 38b that guides flow of the cooling water in the inner part 46. A convex part 38a1 is formed in a lower end 38a of the frame 38. The convex part 38a1 protrudes toward an inner wall 33 of the tubular body 32. A surface of the convex part 38a1 facing the inner part 46 is a deflection surface 62. The deflection surface 62 is continuous to a flow passage surface 38b, and changes a direction of the cooling water passing through the flow passage surface 38b. A ring-shaped gap is formed between a tip end of the convex part 38a1 and the inner wall 33 of the tubular body 32. The ring-shaped gap corresponds to the ejection part 52 of the cooling water.

The convex part 38a1 of the frame 38 protrudes toward the inner wall 33 of the tubular body 32, and a width D1 of the ejection part 52 is narrower than a width D2 of the inner part 46. Due to this structure, the cooling water passing through the flow passage surface 38b can be directed by the deflection surface 62. As a result, the cooling water collides with the inner wall 33 of the tubular body 32, and is reflected to an inner side of the tubular body 32.

Since the cooling water passes through the above-described flow passage, the cooling water supplied from the ejection part 52 to the inside of the tubular body 32 becomes the inverted conical water flow 50. In a case where D1 equals to D2, the cooling water supplied from the ejection part 52 to the inside of the tubular body 32 flows in parallel to the inner wall of the tubular body 32, and thus the inverted conical water flow 50 is less likely to be formed.

From the viewpoint that the inverted conical water flow 50 is likely to be formed, D1/D2 may be from 1/10 to 2/3, and preferably from 1/10 to 1/2.

The cooling water supplied from the ejection part 52 to the inside of the tubular body 32 may flow straightly toward the central axial line O of the tubular body 32. The inverted conical water flow 50 may be a water flow that circulates around the central axial line O without flowing straightly.

In the gas atomizing method, a particle size and a particle size distribution of the fine powder may be controlled by a pressure of the high-pressure gas 26a, a dropping amount of the molten metal 21 per unit time, a pressure of the water flow 50, or the like. The particle size and the particle size distribution of the fine powder approximately match the particle size and the particle size distribution of the soft magnetic metal powder (uncoated particles).

After carrying out the gas atomizing method, a heat treatment on the fine powder (metal fine particles) is performed in an oxidizing atmosphere. S or the element M located near a surface of each of the metal fine particles tends to be preferentially oxidized in comparison to other elements. Accordingly, when the fine powder is heated in the oxidizing atmosphere, the surface of each of the metal fine particles becomes the oxidized part 3 including at least one kind of element of S and the element M. On the other hand, the inside of the metal fine particles is not oxidized, and becomes the metal particles 2 covered with the oxidized part 3. That is, due to the heat treatment, the fine powder becomes the soft magnetic metal powder (uncoated particles) according to this embodiment. A concentration of oxygen in the oxidizing atmosphere is preferably from 100 ppm by volume to 10000 ppm by volume, and more preferably from 100 ppm by volume to 1000 ppm by volume. In a case where the concentration of oxygen in the oxidizing atmosphere is within the ranges, the concentration of S or the element M in an uncoated particle is likely to be maximum in the oxidized part 3, and the soft magnetic metal powder is likely to have both a high withstand voltage and high saturation magnetization. In a case where the concentration of oxygen in the oxidizing atmosphere is excessively low, the concentration of S or the element M in the uncoated particle is likely to be maximum in the metal particle 2 instead of the oxidized part 3. As a result, the soft magnetic metal powder is less likely to have a high withstand voltage. In a case where the concentration of oxygen in the oxidizing atmosphere is excessively high, the oxidized part 3 is excessively thick, and soft magnetic characteristics of the soft magnetic metal powder are likely to be impaired. For example, in accordance with an increase in the concentration of oxygen in the oxidizing atmosphere, the saturation magnetization of the soft magnetic metal powder is likely to decrease. In addition, in accordance with an increase in the concentration of oxygen in the oxidizing atmosphere, $\Delta[S]$ and $\Delta[M]$ are likely to increase.

The temperature (heat treatment temperature) of the fine powder in the heat treatment is preferably from 350° C. to 650° C., and more preferably from 400° C. to 650° C. When the heat treatment temperature is controlled to be 350° C. or higher, the concentration of S or the element M in the uncoated particle is likely to be maximum in the oxidized part 3, and the soft magnetic metal powder is likely to have a high withstand voltage. When the heat treatment temperature is controlled to be 400° C. or higher, the nanocrystal phase is likely to precipitate in the metal fine particles (metal particle 2), and the soft magnetic metal powder is likely to have high saturation magnetization. For example, a part or the entirety of amorphous phases in the metal fine particles may be changed into a nanocrystal phase due to the heat treatment. A plurality of nanocrystal phases may precipitate in an amorphous phase, and a nanohetero structure may be formed in the metal particle 2 due to the heat treatment. In a case where the heat treatment temperature is excessively high, the oxidized part 3 becomes excessively thick, and soft magnetic characteristics of the soft magnetic metal powder are likely to be impaired. Precipitation of the nanocrystal phase in the heat treatment may be promoted by adjusting a temperature of the high-pressure gas 26a, a pressure of the high-pressure gas 26a, a pressure of the water flow 50, or the like.

For example, time (heat treatment time) for which the temperature of the fine powder is maintained at the heat treatment temperature may be from 0.1 hours to 10 hours. A temperature rising rate of the fine powder in the heat treatment is not limited and may be changed depending on a furnace that is used in the heat treatment. In the heat treatment, it is preferable that the temperature of the fine powder is rapidly raised. For example, in a case where an infrared image furnace is used in the heat treatment, the temperature rising rate of the fine powder in the heat treatment may be from 1° C./minute to 6000° C./minute. The temperature rising rate of the fine powder in the heat treatment is a temperature rising rate until the temperature of the fine powder reaches the heat treatment temperature from room temperature.

After the heat treatment, the surface of the oxidized part 3 of each soft magnetic metal particle 1 (uncoated particle) may be covered with the coating part 4. For example, a method for forming the coating part 4 may be at least one kind selected from the group consisting of a powder sputtering method, a sol-gel method, a mechanochemical coating method, a phosphate treatment method, an immersing method, and a heat treatment method. For example, in a case where the coating part 4 consists of a plurality of coating layers having compositions different from each other, the coating part 4 may be formed by a combination of a plurality of methods.

In the mechanochemical coating method, a mixture (powder) of uncoated particles and a raw material of the coating part is contained in a container of a powder coating device. When the container is rotated, the mixture is compressed between a grinder provided in the container and an inner wall of the container, and a frictional heat occurs in the mixture. The raw material of the coating part is softened due to the frictional heat. In addition, when the raw material of the coating part is fixed to the surface of the coated particles (the surface of the oxidized part 3) due to a compression operation, the coating part 4 is formed. The frictional heat can be controlled by adjusting a rotation speed of the container, and a distance between the grinder and the inner wall of the container. The frictional heat may be controlled in correspondence with a composition of the raw material of the coating part.

(Electronic Component)

An electronic component according to this embodiment includes the soft magnetic metal powder. For example, the electronic component may be an inductor, a transformer, a choke coil, and an electromagnetic interference (EMI) filter. The electronic components may include a coil, and a magnetic core that is disposed on an inner side of the coil. The magnetic core may include the soft magnetic metal powder. For example, the magnetic core may include the soft magnetic metal powder and a binder. The binder binds a plurality of soft magnetic alloy particles included in the soft magnetic metal powder. For example, the binder may include a thermosetting resin such as an epoxy resin. The inner side of the coil may be filled with a mixture of the soft magnetic metal powder and the binder, and the entirety of the coil may be coated with the mixture of the soft magnetic metal powder and the binder. The electronic component may be a magnetic head or an electromagnetic wave shield.

The invention is not necessarily limited to the embodiment. Various modifications of the invention can be made within a range not departing from the gist of the invention, and these modification examples are included in the invention.

For example, the above-described soft magnetic metal powder can be produced in a case where the metal raw material that is used in the gas atomizing method does not include S and the element M. In a case where the metal raw material does not include S and the element M, the oxidized part 3 may be formed by the same method as the formation method of the coating part 4. For example, an oxide including at least any one of S and the element M may be caused to directly adhere to the surface of the metal fine particles. After the at least any one of S and the element M is caused to directly adhere to the surface of the metal fine particles, the above-described heat treatment may be performed. However, the soft magnetic metal powder produced from the metal raw material including at least one kind of element between S and the element M is more excellent in the withstand voltage and the soft magnetic characteristics than the soft magnetic metal powder produced from the metal raw material that does not include S and the element M.

EXAMPLES

The invention will be described in more detail with reference to the following examples and comparative examples. However, the invention is not limited to the following examples.

Soft magnetic metal powders of Samples 1 to 140 were respectively produced and analyzed by the following method. However, Samples 34, 42, and 45 do not exist.

(Composition of Metal Raw Material)

Metal raw materials of the soft magnetic metal powders of Samples 1 to 140 were prepared by mixing a plurality of kinds of raw materials in a predetermined ratio. A composition of the entirety of the metal raw material of each of Samples 1 to 140 is expressed by the following Chemical Formula 1. In the following Chemical Formula 1, h equals to a+b+c+d+e+f.

$$(Fe_{(1-(\alpha+\beta))}X1_\alpha X2_\beta)_{(1-h)}M'_a B_b P_c Si_d C_e S_f \qquad (1)$$

An element M' in Chemical Formula 1 of each of Samples 1 to 70 and 81 to 140 is only Nb. The element M' and a in Chemical Formula 1 of each of Samples 71 to 80 are shown in the following Table 9.

Both α and β in Chemical Formula 1 of each of Samples 1 to 80 and 135 to 140 are zero.

An element X1 and a in Chemical Formula 1 of each of Samples 81 to 86 are shown in the following Table 10. β in Chemical Formula 1 of each of Samples 81 to 86 is zero.

α in Chemical Formula 1 of each of Samples 87 to 118 is zero. An element X2 and β in Chemical Formula 1 of each of Samples 87 to 118 are shown in the following Table 10 or Table 11.

The element X1, the element X2, α, and β in Chemical Formula 1 of each of Samples 119 to 134 are shown in the following Table 12.

Both d and e in Chemical Formula 1 of each of Samples 1 to 16 were zero.

1−h in Chemical Formula 1 of each of Samples 1 to 16 was 0.795.

a in Chemical Formula 1 of each of Samples 1 to 16 was 0.060.

b in Chemical Formula 1 of each of Samples 1 to 16 was 0.090.

c in Chemical Formula 1 of each of Samples 1 to 16 was 0.050.

f in Chemical Formula 1 of each of Samples 1 to 16 was 0.005.

All of d, e, and f in Chemical Formula 1 of each of Samples 17 to 24 are zero. 1−h, a, b, and c in Chemical Formula 1 of each of Samples 17 to 24 are shown in the following Table 2.

All of d, e, and f in Chemical Formula 1 of each of Samples 25 to 30 are zero. 1−h, a, b, and c in Chemical Formula 1 of each of Samples 25 to 30 are shown in the following Table 3.

All of d, e, and f in Chemical Formula 1 of each of Samples 31 to 37, 135, and 136 are zero. 1−h, a, b, and c in Chemical Formula 1 of each of Samples 31 to 37 are shown in the following Table 4 or Table 13. Compositions of the entirety of the metal raw material of Samples 135 and 136 were the same as each other.

1−h, a, b, c, d, e, and f in Chemical Formula 1 of each of Samples 38 to 47 are shown in the following Table 5.

Both e and f in Chemical Formula 1 of each of Samples 51 to 60 are zero. 1−h, a, b, c, and d in Chemical Formula 1 of each of Samples 51 to 60 are shown in the following Table 6.

e in Chemical Formula 1 of each of Samples 61 to 66, and 137 to 140 is zero. 1−h, a, b, c, d, and f in Chemical Formula 1 of each of Samples 61 to 66 are shown in the following Table 7.

1−h in Chemical Formula 1 of each of Samples 137 to 140 was 0.7750.

a in Chemical Formula 1 of each of Samples 137 to 140 was 0.060.

b in Chemical Formula 1 of each of Samples 137 to 140 was 0.090.

c in Chemical Formula 1 of each of Samples 137 to 140 was 0.050.

d in Chemical Formula 1 of each of Samples 137 to 140 was 0.020.

f in Chemical Formula 1 of each of Samples 137 to 140 was 0.005.

All of d, e, and f in Chemical Formula 1 of each of Samples 67 to 69 are zero. 1−h, a, b, and c in Chemical Formula 1 of each of Samples 67 to 69 are shown in the following Table 8.

Chemical Formula 1 of each of Samples 70 to 80 is the same as Chemical Formula 1 of Sample 12 except for the element M' and a.

Chemical Formula 1 of each of Samples 81 to 134 is the same as Chemical Formula 1 of Sample 12 except for the element X1, the element X2, α(1−h), and β(1−h).

All samples described in the following Table 2 to Table 13 are classified as examples.

(Gas Atomizing Method)

The fine powder (metal fine particles) of each sample was produced by the gas atomizing method using the metal raw material of the each sample. In the gas atomizing method, the gas atomizing apparatus illustrated in FIG. 3 and FIG. 4 was used. Details of the gas atomizing method were as follows.

The metal raw material was contained in the container 22. The metal raw material in the container 22 was heated by high frequency induction using the coil 24, and the molten metal 21 was obtained. A temperature of the molten metal 21 was 1500° C.

After the atmosphere inside the tubular body 32 of the cooling unit 30 was evacuated, cooling water was supplied from the introduction part 36 to the inside of the tubular body 32, and thus the water flow 50 was formed inside the tubular body 32. A shape of the water flow 50 was an inverted cone. A pressure (pump pressure) of the water flow 50 was 7.5 MPa. An inner diameter of the tubular body 32 was 300 mm A ratio (D1/D2) of D1 and D2 in FIG. 4 was ½. An angle θ1 in FIG. 4 was 20°.

The molten metal 21 was supplied dropwise from the ejection port of the container 22 toward the cooling unit 30. In addition, the high-pressure gas 26a is sprayed from the gas nozzle 26 to the molten metal 21. The high-pressure gas 26a was an argon gas. A pressure of the high-pressure gas 26a was 5 MPa. Due to the spraying of the high-pressure gas 26a, the molten metal 21 was converted into a plurality of fine liquid droplets 21a. The liquid droplets 21a were moved to the inside of the tubular body 32 of the cooling unit 30 along the high-pressure gas 26a. The liquid droplets 21a collide with the inverted conical water flow 50 inside the tubular body 32, and thus the liquid droplets 21a were decomposed into finer liquid droplets. The fine liquid droplets were rapidly cooled by the water flow 50 and were solidified, and thus a fine powder (metal fine particles) was obtained. The water flow 50 (cooling water) including the fine powder was discharged from the discharge part 34 to the outside of the tubular body 32, and the fine powder was recovered from the cooling water.

After carrying out the gas atomizing method, a heat treatment on the fine powder of each sample was performed in an oxidizing atmosphere. The oxidizing atmosphere was a mixed gas of oxygen and nitrogen. A concentration of oxygen in the oxidizing atmosphere is shown in a column of <O> in the following tables. A temperature (heat treatment temperature) of the fine powder in the heat treatment is shown in a column of Temp in the following tables. A time (heat treatment time) for which the temperature of the fine powder is maintained at the heat treatment temperature is shown in a column of Time in the following tables. A temperature rising rate of the fine powder in the heat treatment is shown in a column of Vt in the following tables.

Through the above-described gas atomizing method and heat treatment, a soft magnetic metal powder (uncoated particles) of each sample was produced.

(Analysis of Soft Magnetic Metal Powder)

The soft magnetic metal powder (uncoated particles) of each of Samples 1 to 140 was analyzed by the following method.

A mixture of the soft magnetic metal powder and a thermosetting resin was molded, and the thermosetting resin was cured, thereby obtaining a molded body. The molded body was processed by ion milling, thereby obtaining a thin film (measurement sample).

Cross-sections of twenty soft magnetic metal particles included in the thin film were observed with STEM. In the cross-section of each of the observed soft magnetic metal particles, a concentration distribution of each element in the soft magnetic metal particle was measured. The concentration distribution of each element was measured along a direction orthogonal to an outermost surface of the soft magnetic metal particle. That is, as illustrated in FIG. 1, the concentration distribution of each element was measured along a line segment that extends in the depth direction d and crosses the soft magnetic metal particle 1. An interval between measurement points was approximately 0.5 nm. EDS was used in measurement of the concentration distribution of each element. A unit of the concentration of the element is atom %.

Results of the above analysis showed that a soft magnetic metal particle (uncoated particle) of each of Samples 1 to 140 consisted of a metal particle and an oxidized part covering the entirety of the metal particle. In any of Samples 1 to 140, a composition of the metal particle approximately matched the composition (Chemical Formula 1 described above) of the entirety of the metal raw material.

An oxidized part of each of Samples 137 and 138 was constituted by Fe, Si, B, Nb, and O. An oxidized part of each of Samples 139 and 140 was constituted by Fe, Si, B, Nb, S, and O.

In the case of Samples 1 to 16, 44 to 47, 70 to 134, 139, and 140, a concentration distribution of S in each soft magnetic metal particle was non-uniform. Any of oxidized parts of soft magnetic metal particles of Samples 3 to 16, 44 to 47, 70 to 134, 139, and 140 included S. In a case where the concentration of S in the oxidized part of each of twenty soft magnetic metal particles is maximum and largest, "Oxidized part" is described in a column of "Largest site of [S]" in the following tables. In the case of a sample in which the concentration of S in the metal particle of each of the twenty soft magnetic metal particles is maximum and largest, "Metal particle" is described in a column of "Largest site of [S]" in the following tables. In the case of a sample in which the largest site of [S] is the oxidized part, [S]m–[S]a was calculated. [S]m–[S]a of each sample is described in a column of Δ[S] of the following tables. [S]m and [S]a of Samples 3 to 16 are shown in the following Table 1. [S]m and [S]a of Samples 139 and 140 are shown in the following Table 14. Definition, a measurement method, and a calculation method of [S]m and [S]a are the same as in the above-described embodiment.

S was not detected in all samples except for Samples 1 to 16, 44 to 47, 70 to 134, 139, and 140.

Note that, [S]a of all of the examples was in a range of from 0 atom % to 3.5 atom %, and [S]m of all of the examples was in a range of from 0 atom % to 7.0 atom %.

In the case of Samples 1 to 140, a concentration distribution of the element M' in the soft magnetic metal particle was non-uniform. All the oxidized part of each of Samples 6 to 140 included the element M'. All the oxidized part of each of Samples 103 to 106, 123, and 131 included not only the element M' but the element X2 (that is, Cr).

In the case of Samples 1 to 5, 137, and 138, the concentration of the element M' was maximum and largest in the metal particle of each of the twenty soft magnetic metal particles.

In the case of Samples 6 to 102, 107 to 122, 124 to 130, 132 to 136, 139, and 140, the concentration of the element M' was maximum and largest in the oxidized part of each of the twenty soft magnetic metal particles.

In the case of Samples 1 to 102, 107 to 122, 124 to 130, 132 to 136, 139, and 140, the following element M is the same as the element M'.

In the case of Samples 103 to 106, 123, and 131, the sum of the concentrations of the element M' and Cr was maximum and largest in the oxidized part of each of the twenty soft magnetic metal particles. In the case of Samples 103 to 106, 123, and 131, the following element M represents all of the element M' and Cr.

[M]m–[M]a of each of Samples 6 to 136, 139, and 140 was calculated. [M]m–[M]a of each sample is described in a column of A[M] in the following tables. [M]m and [M]a of each of Samples 6 to 16 are shown in the following Table 1. [M]m and [M]a of each of Samples 139 and 140 are shown in the following Table 14. Definition, a measurement method, and a calculation method of [M]m and [M]a are the same as in the above-described embodiment.

Note that, [M]a of all examples was in a range of from 0 atom % to 15.0 atom %, and [M]m of all examples was in a range of from 0 atom % to 17.0 atom %.

As an example of a concentration distribution of each element, a concentration distribution of each element in the soft magnetic metal particle of Sample 63 is shown in FIG. 5. As shown in FIG. 5, a peak (maximum value) of the concentration of each of Nb, S, Si, and O existed. The peak of each of Nb, S, Si, and O was measured in a region (oxidized part) in which a depth from an outermost surface of the soft magnetic metal particle is within approximately 20 nm. Particularly, the peak of each of Nb and S was measured in an inner region of oxidized part. Definition of the inner region of the oxidized part is similar as in the above-described embodiment.

An X-ray diffraction pattern of each of Samples 1 to 140 was measured by using a powder X-ray diffraction device. A crystal structure of the soft magnetic metal powder of each of Samples 1 to 140 was analyzed on the basis of X-ray diffraction pattern of each of Samples 1 to 140 and observation on the soft magnetic metal particle with the STEM. Results are shown in a column of "Nanocrystal" in the following tables. In a case where a nanoscale crystal is not found in the soft magnetic metal particle, and a diffraction X-ray derived from a body-centered cubic lattice structure is not detected, "None" is described in the column of "Nanocrystal". In other words, in a case where the metal particle in the soft magnetic metal particle consists of an amorphous phase, "None" is described in the column of "Nanocrystal". In a case where a plurality of nanocrystals having an average grain size of 5 to 30 nm are included in the soft magnetic metal particle, and the diffraction X-rays derived from the body-centered cubic lattice structure is detected, "Present" is described in the column of "Nanocrystal". In other words, in a case where the metal particle in the soft magnetic metal particle includes the nanocrystal phase, "Present" is described in the column of "Nanocrystal".

(Measurement of Magnetic Characteristics)

Saturation magnetization of the soft magnetic metal powder (uncoated particles) of each of Samples 1 to 140 was measured by the following method.

20 g of soft magnetic metal powder (uncoated particles) and paraffin were contained in a tubular plastic case. An inner diameter ϕ of the plastic case was 6 mm, and a length of the plastic case was 5 mm. The paraffin inside the plastic case was melted through heating, and then the paraffin was solidified to obtain a measurement sample. The saturation magnetization of the measurement sample was measured. In the measurement of the saturation magnetization, VSM (vibration sample magnetometer) manufactured by TAMAKAWA CO., LTD. was used. Saturation magnetization σs (unit: $A \cdot m^2/kg$) per unit mass of each of Samples 1 to 140 is shown in the following tables. It is preferable that the saturation magnetization σs is high.

(Measurement of Withstand Voltage of Uncoated Particle)

A withstand voltage of the soft magnetic metal powder (uncoated particles) of each of Samples 1 to 16, and 137 to 140 was measured by the following method.

An epoxy resin (thermosetting resin), an imide resin (curing agent), and acetone were mixed to prepare a solution. The solution was mixed with the soft magnetic metal powder (uncoated particles), and then the acetone was vaporized to obtain a granulated powder. The total mass of the epoxy resin and the imide resin was 3 parts by mass with respect to 100 parts by mass of soft magnetic metal powder. The granulated powder was size-regulated by using a mesh. A mesh opening of the mesh was 355 μm. A molded body was obtained through molding of the size-regulated granulated powder by using a toroidal mold. An inner diameter of the mold was 6.5 mm, and an outer diameter of the mold was 11 mm. A molding pressure was 3.0 t/cm². The molded body was heated at 180° C. for one hour to cure the epoxy resin. A dust core was obtained by the above-described method.

A voltage was applied to the dust core by using a source meter. A current in the dust core was continuously measured while continuously increasing the voltage. A withstand voltage of the dust core is defined as a voltage when a current in the dust core reaches 1 mA. A withstand voltage V1 (unit: V/mm) of the soft magnetic metal powder (uncoated particles) of each of Samples 1 to 16 is shown in the following Table 1. A withstand voltage V1 of the soft magnetic metal powder (uncoated particles) of each of Samples 137 to 140 is shown in the following Table 14. It is preferable that V1 is high.

(Formation of Coating Part)

A coating part was formed on the entirety of a surface of the uncoated particles (soft magnetic metal powder) of each of Samples 1 to 140 by a mechanochemical coating method. As a raw material of the coating part, powder glass was used. That is, the entirety of the oxidized part of the uncoated particles of each of Samples 1 to 140 was covered with the coating part consisting of the glass. The mass of the powder glass was 0.5 parts by mass with respect to 100 parts by mass of uncoated particles (soft magnetic metal powder). The thickness of the coating part was approximately 50 nm.

The powder glass used in formation of the coating part of each of Samples 1 to 134, and 137 to 140 was phosphate-based glass. Main components of the phosphate-based glass are expressed as $P_2O_5$—ZnO—$R_2O$—$Al_2O_3$. R is an alkali metal. The content of $P_2O_5$ in the phosphate-based glass was 50% by mass. The content of ZnO in the phosphate-based glass was 12% by mass. The content of $R_2O$ in the phosphate-based glass was 20% by mass. The content of $Al_2O_3$ in the phosphate-based glass was 6% by mass. In addition to the four components, 12% by mass of sub-component was included in the phosphate-based glass.

The powder glass used in formation of the coating part of Sample 135 was bismuthate-based glass. Main components of the bismuthate-based glass are expressed as $Bi_2O_3$—ZnO—$B_2O_3$—$SiO_2$. The content of $Bi_2O_3$ in the bismuthate-based glass was 80% by mass. The content of ZnO in the bismuthate-based glass was 10% by mass. The content of $B_2O_3$ in the bismuthate-based glass was 5% by mass. The content of $SiO_2$ in the bismuthate-based glass was 5% by mass.

The powder glass used in formation of the coating part of Sample 136 was borosilicate-based glass. Main components of the borosilicate-based glass are expressed as BaO—ZnO—$B_2O_3$—$SiO_2$—$Al_2O_3$. The content of BaO in the borosilicate-based glass was 8% by mass. The content of ZnO in the borosilicate-based glass was 23% by mass. The content of $B_2O_3$ in the borosilicate-based glass was 19% by mass. The content of $SiO_2$ in the borosilicate-based glass was 16% by mass. The content of $Al_2O_3$ in the borosilicate-based glass was 6% by mass. The borosilicate-based glass further included a sub-component as the remainder other than the main components.

As to be described later, the coated particle of each of Samples 135 and 136 had high V2 as in the coated particle (example) including the phosphate-based glass as the coating part.

(Measurement of Withstand Voltage of Coated Particle)

After forming the coating part, a withstand voltage V2 of the soft magnetic metal powder (coated particles) of each of Samples 1 to 140 was measured. A measurement method of the withstand voltage V2 of the coated particles was similar to the measurement method of the withstand voltage V1 of the uncoated particles. The withstand voltage V2 (unit: V/mm) of the soft magnetic metal powder (coated particles) of each of Samples 1 to 140 is shown in the following tables. It is preferable that V2 is high.

TABLE 1

| Samples | Classification | Temp °C. | Time min | Vt °C./min | <O> vol · ppm | Nano-crystal | Largest site of [S] | Largest site of [M] | [S]a Atom % | [S]m Atom % | [M]a Atom % | [M]m Atom % | Δ[S] Atom % | Δ[M] Atom % | σs A · m²/kg | V1 V/mm | V2 V/mm |
|---|---|---|---|---|---|---|---|---|---|---|---|---|---|---|---|---|---|
| 1 | Comparative Example | 350 | 60 | 10 | 10 | None | Metal particle | Metal particle | — | — | 5.9 | 5.5 | — | — | 171 | 119 | 350 |
| 2 | Comparative Example | 600 | 60 | 10 | 10 | Present | Metal particle | Metal particle | — | — | 6.0 | 5.6 | — | — | 175 | 118 | 348 |
| 3 | Example | 350 | 60 | 10 | 100 | None | Oxidized part | Metal particle | 0.0 | 0.2 | 6.1 | 5.4 | 0.2 | — | 176 | 135 | 393 |
| 4 | Example | 600 | 60 | 10 | 100 | Present | Oxidized part | Metal particle | 0.0 | 0.4 | 5.9 | 5.5 | 0.4 | — | 179 | 137 | 390 |
| 5 | Example | 350 | 60 | 10 | 200 | None | Oxidized part | Metal particle | 0.0 | 0.7 | 5.9 | 5.8 | 0.7 | — | 181 | 140 | 427 |
| 6 | Example | 600 | 60 | 10 | 200 | Present | Oxidized part | Oxidized part | 0.0 | 1.2 | 6.0 | 6.4 | 1.2 | 0.4 | 183 | 143 | 438 |
| 7 | Example | 350 | 60 | 10 | 400 | None | Oxidized part | Oxidized part | 0.0 | 1.2 | 5.8 | 6.4 | 1.2 | 0.6 | 181 | 140 | 521 |
| 8 | Example | 600 | 60 | 10 | 400 | Present | Oxidized part | Oxidized part | 0.0 | 2.1 | 5.8 | 7.1 | 2.1 | 1.3 | 185 | 147 | 552 |
| 9 | Example | 350 | 60 | 10 | 1000 | None | Oxidized part | Oxidized part | 0.0 | 1.6 | 5.9 | 6.6 | 1.6 | 0.7 | 179 | 152 | 540 |
| 10 | Example | 600 | 60 | 10 | 1000 | Present | Oxidized part | Oxidized part | 0.0 | 2.6 | 5.7 | 7.3 | 2.6 | 1.6 | 184 | 151 | 561 |
| 11 | Example | 350 | 60 | 10 | 2000 | None | Oxidized part | Oxidized part | 0.0 | 1.9 | 5.7 | 6.4 | 1.9 | 0.7 | 177 | 154 | 565 |
| 12 | Example | 600 | 60 | 10 | 2000 | Present | Oxidized part | Oxidized part | 0.0 | 3.1 | 5.7 | 7.5 | 3.1 | 1.8 | 183 | 152 | 579 |
| 13 | Example | 350 | 60 | 10 | 5000 | None | Oxidized part | Oxidized part | 0.0 | 2.0 | 5.7 | 6.6 | 2.0 | 0.9 | 155 | 152 | 566 |
| 14 | Example | 600 | 60 | 10 | 5000 | Present | Oxidized part | Oxidized part | 0.0 | 3.3 | 5.6 | 7.5 | 3.3 | 1.9 | 156 | 153 | 576 |
| 15 | Example | 350 | 60 | 10 | 10000 | None | Oxidized part | Oxidized part | 0.0 | 2.1 | 5.8 | 7.0 | 2.1 | 1.2 | 142 | 155 | 551 |
| 16 | Example | 600 | 60 | 10 | 10000 | Present | Oxidized part | Oxidized part | 0.0 | 3.5 | 5.7 | 7.8 | 3.5 | 2.1 | 151 | 153 | 562 |

TABLE 2

| Samples | Fe 1-h | M'(Nb) a | B b | P c | Temp °C. | Time min | Vt °C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|
| 17 | 0.840 | 0.020 | 0.090 | 0.050 | 600 | 60 | 10 | 2000 | Present | — | Oxidized part | — | 0.6 | 179 | 438 |
| 18 | 0.820 | 0.040 | 0.090 | 0.050 | 600 | 60 | 10 | 2000 | Present | — | Oxidized part | — | 0.7 | 177 | 469 |
| 19 | 0.810 | 0.050 | 0.090 | 0.050 | 600 | 60 | 10 | 2000 | Present | — | Oxidized part | — | 1.0 | 173 | 522 |
| 20 | 0.800 | 0.060 | 0.090 | 0.050 | 600 | 60 | 10 | 2000 | Present | — | Oxidized part | — | 1.2 | 170 | 524 |
| 21 | 0.780 | 0.080 | 0.090 | 0.050 | 600 | 60 | 10 | 2000 | Present | — | Oxidized part | — | 1.5 | 167 | 545 |
| 22 | 0.760 | 0.100 | 0.090 | 0.050 | 600 | 60 | 10 | 2000 | Present | — | Oxidized part | — | 1.5 | 162 | 548 |
| 23 | 0.740 | 0.120 | 0.090 | 0.050 | 600 | 60 | 10 | 2000 | Present | — | Oxidized part | — | 1.8 | 158 | 553 |
| 24 | 0.720 | 0.140 | 0.090 | 0.050 | 600 | 60 | 10 | 2000 | Present | — | Oxidized part | — | 2.2 | 155 | 558 |

TABLE 3

| Samples | Fe 1-h | M'(Nb) a | B b | P c | Temp °C. | Time min | Vt °C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|
| 25 | 0.870 | 0.060 | 0.020 | 0.050 | 600 | 60 | 10 | 2000 | Present | — | Oxidized part | — | 1.3 | 181 | 418 |
| 26 | 0.830 | 0.060 | 0.060 | 0.050 | 600 | 60 | 10 | 2000 | Present | — | Oxidized part | — | 1.1 | 179 | 463 |
| 27 | 0.810 | 0.060 | 0.080 | 0.050 | 600 | 60 | 10 | 2000 | Present | — | Oxidized part | — | 1.4 | 173 | 502 |
| 28 | 0.770 | 0.060 | 0.120 | 0.050 | 600 | 60 | 10 | 2000 | Present | — | Oxidized part | — | 0.8 | 158 | 534 |
| 29 | 0.740 | 0.060 | 0.150 | 0.050 | 600 | 60 | 10 | 2000 | Present | — | Oxidized part | — | 1.2 | 153 | 538 |
| 30 | 0.690 | 0.060 | 0.200 | 0.050 | 600 | 60 | 10 | 2000 | Present | — | Oxidized part | — | 1.1 | 149 | 550 |

TABLE 4

| Samples | Fe 1-h | M'(Nb) a | B b | P c | Temp °C. | Time min | Vt °C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|
| 31 | 0.850 | 0.060 | 0.090 | 0.000 | 600 | 60 | 10 | 2000 | Present | — | Oxidized part | — | 1.3 | 188 | 441 |
| 32 | 0.840 | 0.060 | 0.090 | 0.010 | 600 | 60 | 10 | 2000 | Present | — | Oxidized part | — | 1.9 | 182 | 467 |
| 33 | 0.820 | 0.060 | 0.090 | 0.030 | 600 | 60 | 10 | 2000 | Present | — | Oxidized part | — | 0.7 | 178 | 502 |
| 35 | 0.770 | 0.060 | 0.090 | 0.080 | 600 | 60 | 10 | 2000 | Present | — | Oxidized part | — | 1.5 | 159 | 575 |
| 36 | 0.750 | 0.060 | 0.090 | 0.100 | 600 | 60 | 10 | 2000 | Present | — | Oxidized part | — | 2.2 | 155 | 615 |
| 37 | 0.700 | 0.060 | 0.090 | 0.150 | 600 | 60 | 10 | 2000 | Present | — | Oxidized part | — | 1.0 | 151 | 671 |

TABLE 5

| Samples | Fe 1-h | M'(Nb) a | B b | P c | Si d | C e | S f | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|---|---|
| 38 | 0.799 | 0.060 | 0.090 | 0.050 | 0.000 | 0.001 | 0.000 | 600 | 60 | 10 | 2000 | Present | — | Oxidized part | — | 2.3 | 173 | 412 |
| 39 | 0.795 | 0.060 | 0.090 | 0.050 | 0.000 | 0.005 | 0.000 | 600 | 60 | 10 | 2000 | Present | — | Oxidized part | — | 2.1 | 173 | 406 |
| 40 | 0.790 | 0.060 | 0.090 | 0.050 | 0.000 | 0.010 | 0.000 | 600 | 60 | 10 | 2000 | Present | — | Oxidized part | — | 0.7 | 171 | 404 |
| 41 | 0.770 | 0.060 | 0.090 | 0.050 | 0.000 | 0.030 | 0.000 | 600 | 60 | 10 | 2000 | Present | — | Oxidized part | — | 1.0 | 169 | 429 |
| 43 | 0.740 | 0.060 | 0.000 | 0.050 | 0.000 | 0.150 | 0.000 | 600 | 60 | 10 | 2000 | Present | — | Oxidized part | — | 1.5 | 163 | 513 |
| 44 | 0.799 | 0.060 | 0.090 | 0.050 | 0.000 | 0.000 | 0.001 | 600 | 60 | 10 | 2000 | Present | Oxidized part | Oxidized part | 0.8 | 0.9 | 174 | 514 |
| 46 | 0.790 | 0.060 | 0.090 | 0.050 | 0.000 | 0.000 | 0.010 | 600 | 60 | 10 | 2000 | Present | Oxidized part | Oxidized part | 3.4 | 2.2 | 173 | 568 |
| 47 | 0.770 | 0.060 | 0.090 | 0.050 | 0.000 | 0.000 | 0.030 | 600 | 60 | 10 | 2000 | Present | Oxidized part | Oxidized part | 3.6 | 2.4 | 166 | 572 |

TABLE 6

| Samples | Fe 1-h | M'(Nb) a | B b | P c | Si d | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|
| 51 | 0.795 | 0.060 | 0.090 | 0.050 | 0.005 | 600 | 60 | 10 | 2000 | Present | — | Oxidized part | — | 1.4 | 163 | 523 |
| 52 | 0.790 | 0.060 | 0.090 | 0.050 | 0.010 | 600 | 60 | 10 | 2000 | Present | — | Oxidized part | — | 0.6 | 160 | 519 |
| 53 | 0.780 | 0.060 | 0.090 | 0.050 | 0.020 | 600 | 60 | 10 | 2000 | Present | — | Oxidized part | — | 0.7 | 158 | 537 |
| 54 | 0.770 | 0.060 | 0.090 | 0.050 | 0.030 | 600 | 60 | 10 | 2000 | Present | — | Oxidized part | — | 1.0 | 155 | 543 |
| 55 | 0.740 | 0.060 | 0.090 | 0.050 | 0.060 | 600 | 60 | 10 | 2000 | Present | — | Oxidized part | — | 1.2 | 152 | 558 |
| 56 | 0.810 | 0.030 | 0.090 | 0.000 | 0.070 | 600 | 60 | 10 | 2000 | Present | — | Oxidized part | — | 1.5 | 147 | 572 |
| 57 | 0.790 | 0.030 | 0.090 | 0.000 | 0.090 | 600 | 60 | 10 | 2000 | Present | — | Oxidized part | — | 0.9 | 145 | 595 |
| 58 | 0.745 | 0.030 | 0.090 | 0.000 | 0.135 | 600 | 60 | 10 | 2000 | Present | — | Oxidized part | — | 1.1 | 143 | 614 |
| 59 | 0.725 | 0.030 | 0.090 | 0.000 | 0.155 | 600 | 60 | 10 | 2000 | Present | — | Oxidized part | — | 1.3 | 140 | 636 |
| 60 | 0.705 | 0.030 | 0.090 | 0.000 | 0.175 | 600 | 60 | 10 | 2000 | Present | — | Oxidized part | — | 1.5 | 138 | 665 |

TABLE 7

| Samples | Fe 1-h | M'(Nb) a | B b | P c | Si d | S f | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|---|
| 61 | 0.765 | 0.000 | 0.100 | 0.000 | 0.130 | 0.005 | 600 | 60 | 10 | 2000 | Present | Oxidized part | — | 3.0 | — | 138 | 532 |
| 62 | 0.785 | 0.060 | 0.090 | 0.050 | 0.010 | 0.005 | 600 | 60 | 10 | 2000 | Present | Oxidized part | Oxidized part | 0.8 | 1.4 | 184 | 432 |
| 63 | 0.765 | 0.060 | 0.090 | 0.050 | 0.030 | 0.005 | 600 | 60 | 10 | 2000 | Present | Oxidized part | Oxidized part | 2.2 | 0.6 | 179 | 447 |
| 64 | 0.745 | 0.060 | 0.090 | 0.050 | 0.050 | 0.005 | 600 | 60 | 10 | 2000 | Present | Oxidized part | Oxidized part | 2.5 | 1.1 | 173 | 479 |

TABLE 7-continued

| Samples | Fe 1-h | M'(Nb) a | B b | P c | Si d | S f | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|---|
| 65 | 0.725 | 0.060 | 0.090 | 0.050 | 0.070 | 0.005 | 600 | 60 | 10 | 2000 | Present | Oxidized part | Oxidized part | 2.7 | 1.0 | 166 | 510 |
| 66 | 0.705 | 0.060 | 0.090 | 0.050 | 0.090 | 0.005 | 600 | 60 | 10 | 2000 | Present | Oxidized part | Oxidized part | 3.6 | 1.2 | 149 | 522 |

TABLE 8

| Samples | Fe 1-h | M'(Nb) a | B b | P c | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|
| 67 | 0.730 | 0.080 | 0.120 | 0.070 | 600 | 60 | 10 | 2000 | Present | — | Oxidized part | — | 1.6 | 158 | 536 |
| 68 | 0.880 | 0.040 | 0.030 | 0.050 | 600 | 60 | 10 | 2000 | Present | — | Oxidized part | — | 0.6 | 179 | 495 |
| 69 | 0.900 | 0.030 | 0.030 | 0.040 | 600 | 60 | 10 | 2000 | Present | — | Oxidized part | — | 0.7 | 183 | 478 |

TABLE 9

| Samples | M' | a | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|
| 70 | Nb | 0.060 | 600 | 60 | 10 | 2000 | Present | Oxidized part | Oxidized part | 3.0 | 1.4 | 176 | 520 |
| 71 | Hf | 0.060 | 600 | 60 | 10 | 2000 | Present | Oxidized part | Oxidized part | 2.5 | 1.2 | 171 | 492 |
| 72 | Zr | 0.060 | 600 | 60 | 10 | 2000 | Present | Oxidized part | Oxidized part | 2.1 | 0.7 | 174 | 497 |
| 73 | Ta | 0.060 | 600 | 60 | 10 | 2000 | Present | Oxidized part | Oxidized part | 1.6 | 0.8 | 166 | 486 |
| 74 | Mo | 0.060 | 600 | 60 | 10 | 2000 | Present | Oxidized part | Oxidized part | 1.8 | 1.2 | 166 | 510 |
| 75 | W | 0.060 | 600 | 60 | 10 | 2000 | Present | Oxidized part | Oxidized part | 1.9 | 1.1 | 170 | 482 |
| 76 | V | 0.060 | 600 | 60 | 10 | 2000 | Present | Oxidized part | Oxidized part | 2.3 | 1.6 | 168 | 503 |
| 77 | Ti | 0.060 | 600 | 60 | 10 | 2000 | Present | Oxidized part | Oxidized part | 2.4 | 1.3 | 170 | 519 |
| 78 | $Nb_{0.5}Hf_{0.5}$ | 0.060 | 600 | 60 | 10 | 2000 | Present | Oxidized part | Oxidized part | 2.7 | 1.9 | 164 | 484 |
| 79 | $Zr_{0.5}Ta_{0.5}$ | 0.060 | 600 | 60 | 10 | 2000 | Present | Oxidized part | Oxidized part | 1.5 | 0.7 | 168 | 510 |
| 80 | $Nb_{0.4}Hf_{0.3}Zr_{0.3}$ | 0.060 | 600 | 60 | 10 | 2000 | Present | Oxidized part | Oxidized part | 2.8 | 0.6 | 172 | 497 |

TABLE 10

| Samples | M' | X1 | α(1-h) | X2 | β(1-h) | Temp ° C. | Time min | Vt ° C./min | <O> vol·ppm | Nano-crystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|
| 81 | Nb | Co | 0.010 | — | 0.000 | 600 | 60 | 10 | 2000 | Present | Oxidized part | Oxidized part | 2.5 | 1.4 | 172 | 517 |
| 82 | Nb | Co | 0.100 | — | 0.000 | 600 | 60 | 10 | 2000 | Present | Oxidized part | Oxidized part | 2.2 | 0.7 | 174 | 509 |
| 83 | Nb | Co | 0.400 | — | 0.000 | 600 | 60 | 10 | 2000 | Present | Oxidized part | Oxidized part | 1.7 | 0.7 | 176 | 532 |
| 84 | Nb | Ni | 0.010 | — | 0.000 | 600 | 60 | 10 | 2000 | Present | Oxidized part | Oxidized part | 1.8 | 0.8 | 175 | 510 |
| 85 | Nb | Ni | 0.100 | — | 0.000 | 600 | 60 | 10 | 2000 | Present | Oxidized part | Oxidized part | 1.9 | 1.2 | 164 | 509 |
| 86 | Nb | Ni | 0.400 | — | 0.000 | 600 | 60 | 10 | 2000 | Present | Oxidized part | Oxidized part | 2.0 | 1.5 | 160 | 502 |

TABLE 10-continued

| Samples | M' | X1 | α(1-h) | X2 | β(1-h) | Temp ° C. | Time min | Vt ° C./min | <O> vol · ppm | Nanocrystal | Largest site of [S] | Largest site of [M] | Δ[S] Atom % | Δ[M] Atom % | σs A · m²/kg | V2 V/mm |
|---|---|---|---|---|---|---|---|---|---|---|---|---|---|---|---|---|
| 87 | Nb | — | 0.000 | Al | 0.001 | 600 | 60 | 10 | 2000 | Present | Oxidized part | Oxidized part | 2.4 | 1.3 | 166 | 489 |
| 88 | Nb | — | 0.000 | Al | 0.005 | 600 | 60 | 10 | 2000 | Present | Oxidized part | Oxidized part | 2.9 | 1.9 | 165 | 518 |
| 89 | Nb | — | 0.000 | Al | 0.010 | 600 | 60 | 10 | 2000 | Present | Oxidized part | Oxidized part | 1.3 | 0.8 | 163 | 566 |
| 90 | Nb | — | 0.000 | Al | 0.030 | 600 | 60 | 10 | 2000 | Present | Oxidized part | Oxidized part | 3.0 | 1.4 | 162 | 590 |
| 91 | Nb | — | 0.000 | Zn | 0.001 | 600 | 60 | 10 | 2000 | Present | Oxidized part | Oxidized part | 2.4 | 1.2 | 164 | 605 |
| 92 | Nb | — | 0.000 | Zn | 0.005 | 600 | 60 | 10 | 2000 | Present | Oxidized part | Oxidized part | 2.1 | 0.9 | 169 | 513 |
| 93 | Nb | — | 0.000 | Zn | 0.010 | 600 | 60 | 10 | 2000 | Present | Oxidized part | Oxidized part | 1.7 | 0.8 | 162 | 533 |
| 94 | Nb | — | 0.000 | Zn | 0.030 | 600 | 60 | 10 | 2000 | Present | Oxidized part | Oxidized part | 1.9 | 1.2 | 164 | 605 |
| 95 | Nb | — | 0.000 | Sn | 0.001 | 600 | 60 | 10 | 2000 | Present | Oxidized part | Oxidized part | 1.9 | 1.1 | 169 | 531 |
| 96 | Nb | — | 0.000 | Sn | 0.005 | 600 | 60 | 10 | 2000 | Present | Oxidized part | Oxidized part | 2.3 | 1.8 | 162 | 582 |
| 97 | Nb | — | 0.000 | Sn | 0.010 | 600 | 60 | 10 | 2000 | Present | Oxidized part | Oxidized part | 2.4 | 1.4 | 165 | 599 |
| 98 | Nb | — | 0.000 | Sn | 0.030 | 600 | 60 | 10 | 2000 | Present | Oxidized part | Oxidized part | 2.8 | 1.9 | 163 | 605 |

TABLE 11

| Samples | M' | X1 | α(1-h) | X2 | β(1-h) | Temp ° C. | Time min | Vt ° C./min | <O> vol · ppm | Nanocrystal | Largest site of [S] | Largest site of [M] | Δ[S] Atom % | Δ[M] Atom % | σs A · m²/kg | V2 V/mm |
|---|---|---|---|---|---|---|---|---|---|---|---|---|---|---|---|---|
| 99 | Nb | — | 0.000 | Cu | 0.001 | 600 | 60 | 10 | 2000 | Present | Oxidized part | Oxidized part | 1.1 | 0.7 | 162 | 567 |
| 100 | Nb | — | 0.000 | Cu | 0.005 | 600 | 60 | 10 | 2000 | Present | Oxidized part | Oxidized part | 3.1 | 1.8 | 163 | 598 |
| 101 | Nb | — | 0.000 | Cu | 0.010 | 600 | 60 | 10 | 2000 | Present | Oxidized part | Oxidized part | 2.4 | 1.5 | 169 | 604 |
| 102 | Nb | — | 0.000 | Cu | 0.030 | 600 | 60 | 10 | 2000 | Present | Oxidized part | Oxidized part | 2.1 | 0.7 | 170 | 637 |
| 103 | Nb | — | 0.000 | Cr | 0.001 | 600 | 60 | 10 | 2000 | Present | Oxidized part | Oxidized part | 1.5 | 1.0 | 168 | 577 |
| 104 | Nb | — | 0.000 | Cr | 0.005 | 600 | 60 | 10 | 2000 | Present | Oxidized part | Oxidized part | 1.8 | 0.9 | 169 | 613 |
| 105 | Nb | — | 0.000 | Cr | 0.010 | 600 | 60 | 10 | 2000 | Present | Oxidized part | Oxidized part | 1.9 | 2.3 | 167 | 604 |
| 106 | Nb | — | 0.000 | Cr | 0.030 | 600 | 60 | 10 | 2000 | Present | Oxidized part | Oxidized part | 2.2 | 2.1 | 163 | 617 |
| 107 | Nb | — | 0.000 | Bi | 0.001 | 600 | 60 | 10 | 2000 | Present | Oxidized part | Oxidized part | 2.5 | 0.7 | 167 | 567 |
| 108 | Nb | — | 0.000 | Bi | 0.005 | 600 | 60 | 10 | 2000 | Present | Oxidized part | Oxidized part | 2.7 | 0.9 | 169 | 587 |
| 109 | Nb | — | 0.000 | Bi | 0.010 | 600 | 60 | 10 | 2000 | Present | Oxidized part | Oxidized part | 1.9 | 1.2 | 167 | 605 |
| 110 | Nb | — | 0.000 | Bi | 0.030 | 600 | 60 | 10 | 2000 | Present | Oxidized part | Oxidized part | 1.8 | 1.4 | 165 | 617 |
| 111 | Nb | — | 0.000 | La | 0.001 | 600 | 60 | 10 | 2000 | Present | Oxidized part | Oxidized part | 1.6 | 1.6 | 162 | 522 |
| 112 | Nb | — | 0.000 | La | 0.005 | 600 | 60 | 10 | 2000 | Present | Oxidized part | Oxidized part | 2.2 | 1.6 | 167 | 579 |
| 113 | Nb | — | 0.000 | La | 0.010 | 600 | 60 | 10 | 2000 | Present | Oxidized part | Oxidized part | 2.6 | 2.1 | 159 | 591 |
| 114 | Nb | — | 0.000 | La | 0.030 | 600 | 60 | 10 | 2000 | Present | Oxidized part | Oxidized part | 2.2 | 1.2 | 157 | 614 |
| 115 | Nb | — | 0.000 | Y | 0.001 | 600 | 60 | 10 | 2000 | Present | Oxidized part | Oxidized part | 1.8 | 1.7 | 160 | 565 |
| 116 | Nb | — | 0.000 | Y | 0.005 | 600 | 60 | 10 | 2000 | Present | Oxidized part | Oxidized part | 1.0 | 2.8 | 156 | 578 |
| 117 | Nb | — | 0.000 | Y | 0.010 | 600 | 60 | 10 | 2000 | Present | Oxidized part | Oxidized part | 1.5 | 2.2 | 157 | 600 |
| 118 | Nb | — | 0.000 | Y | 0.030 | 600 | 60 | 10 | 2000 | Present | Oxidized part | Oxidized part | 1.6 | 0.8 | 154 | 608 |

TABLE 12

| Samples | M' | X1 | α(1-h) | X2 | β(1-h) | Temp °C. | Time min | Vt °C./min | <O> vol·ppm | Nanocrystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|
| 119 | Nb | Co | 0.000 | Al | 0.050 | 600 | 60 | 10 | 2000 | Present | Oxidized part | Oxidized part | 2.8 | 0.6 | 160 | 568 |
| 120 | Nb | Co | 0.000 | Zn | 0.050 | 600 | 60 | 10 | 2000 | Present | Oxidized part | Oxidized part | 2.9 | 2.8 | 163 | 570 |
| 121 | Nb | Co | 0.000 | Sn | 0.050 | 600 | 60 | 10 | 2000 | Present | Oxidized part | Oxidized part | 3.3 | 2.4 | 162 | 566 |
| 122 | Nb | Co | 0.100 | Cu | 0.050 | 600 | 60 | 10 | 2000 | Present | Oxidized part | Oxidized part | 2.7 | 2.3 | 166 | 589 |
| 123 | Nb | Co | 0.100 | Cr | 0.050 | 600 | 60 | 10 | 2000 | Present | Oxidized part | Oxidized part | 0.8 | 2.1 | 169 | 573 |
| 124 | Nb | Co | 0.100 | Bi | 0.050 | 600 | 60 | 10 | 2000 | Present | Oxidized part | Oxidized part | 2.5 | 1.9 | 161 | 565 |
| 125 | Nb | Co | 0.100 | La | 0.050 | 600 | 60 | 10 | 2000 | Present | Oxidized part | Oxidized part | 2.0 | 3.1 | 169 | 579 |
| 126 | Nb | Co | 0.100 | Y | 0.050 | 600 | 60 | 10 | 2000 | Present | Oxidized part | Oxidized part | 2.2 | 1.3 | 168 | 560 |
| 127 | Nb | Ni | 0.100 | Al | 0.050 | 600 | 60 | 10 | 2000 | Present | Oxidized part | Oxidized part | 1.4 | 1.8 | 165 | 576 |
| 128 | Nb | Ni | 0.100 | Zn | 0.050 | 600 | 60 | 10 | 2000 | Present | Oxidized part | Oxidized part | 1.2 | 1.5 | 163 | 582 |
| 129 | Nb | Ni | 0.100 | Sn | 0.050 | 600 | 60 | 10 | 2000 | Present | Oxidized part | Oxidized part | 1.8 | 2.2 | 157 | 565 |
| 130 | Nb | Ni | 0.100 | Cu | 0.050 | 600 | 60 | 10 | 2000 | Present | Oxidized part | Oxidized part | 1.4 | 2.8 | 168 | 577 |
| 131 | Nb | Ni | 0.100 | Cr | 0.050 | 600 | 60 | 10 | 2000 | Present | Oxidized part | Oxidized part | 1.2 | 0.6 | 167 | 559 |
| 132 | Nb | Ni | 0.100 | Bi | 0.050 | 600 | 60 | 10 | 2000 | Present | Oxidized part | Oxidized part | 1.5 | 1.5 | 164 | 574 |
| 133 | Nb | Ni | 0.100 | La | 0.050 | 600 | 60 | 10 | 2000 | Present | Oxidized part | Oxidized part | 1.2 | 0.9 | 160 | 563 |
| 134 | Nb | Ni | 0.100 | Y | 0.050 | 600 | 60 | 10 | 2000 | Present | Oxidized part | Oxidized part | 1.3 | 1.9 | 164 | 570 |

TABLE 13

| Samples | Fe 1-h | M'(Nb) a | B b | P c | Temp °C. | Time min | Vt °C./min | <O> vol·ppm | Kind of powder glass | Nanocrystal | Largest site of [S] | Largest site of [M] | Δ[S] Atom % | Δ[M] Atom % | σs A·m²/kg | V2 V/mm |
|---|---|---|---|---|---|---|---|---|---|---|---|---|---|---|---|---|
| 135 | 0.800 | 0.060 | 0.090 | 0.050 | 600 | 60 | 10 | 2000 | Bi₂O₃-based | Present | — | Oxidized part | — | 0.6 | 168 | 525 |
| 136 | 0.800 | 0.060 | 0.090 | 0.050 | 600 | 60 | 10 | 2000 | B₂O₃-SiO₂-based | Present | — | Oxidized part | — | 0.8 | 164 | 529 |

TABLE 14

| Samples | Classification | Temp °C. | Time min | Vt °C./min | <O> vol·ppm | Nanocrystal | Largest site of [S] | Largest site of [M] | [S]a Atom % | [S]m Atom % | [M]a Atom % | [M]m Atom % | Δ[S] Atom % | Δ[M] Atom % | σs A·m²/kg | V1 V/mm | V2 V/mm |
|---|---|---|---|---|---|---|---|---|---|---|---|---|---|---|---|---|---|
| 137 | Comparative Example | 350 | 60 | 10 | 10 | None | — | Metal particle | — | — | 5.9 | 5.5 | — | — | 174 | 118 | 349 |
| 138 | Comparative Example | 600 | 60 | 10 | 10 | Present | — | Metal particle | — | — | 6.1 | 5.8 | — | — | 176 | 116 | 352 |
| 139 | Example | 350 | 60 | 10 | 1000 | None | Oxidized part | Oxidized part | 0.0 | 1.3 | 5.8 | 6.7 | 1.3 | 0.9 | 179 | 153 | 542 |
| 140 | Example | 600 | 60 | 10 | 1000 | Present | Oxidized part | Oxidized part | 0.0 | 2.0 | 5.8 | 7.1 | 2.0 | 1.3 | 182 | 149 | 557 |

INDUSTRIAL APPLICABILITY

For example, the soft magnetic metal powder according to the invention is suitable for a material of a magnetic core of an inductor.

REFERENCE SIGNS LIST

1: soft magnetic metal particle, 2: metal particle, 3: oxidized part, 4: coating part.

What is claimed is:

1. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes at least one element M,
the element M is at least one kind of element selected from the group consisting of Nb, Ta, W, Zr, Hf, and Cr,
a unit of a concentration of the element M in the metal particle and the oxidized part is atom %,
the concentration of the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m, and
wherein [M]m−[M]a is 0.4 atom % or more and 5.0 atom % or less.

2. An electronic component containing:
the soft magnetic metal powder according to claim 1.

3. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes at least one element M,
the element M is at least one kind of element selected from the group consisting of Nb, Ta, W, Zr, Hf, and Cr,
a unit of a concentration of the element M in the metal particle and the oxidized part is atom %,
the concentration of the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m,
[M]m−[M]a is 0.4 atom % or more,
wherein [M]a is from 0 atom % to 16.0 atom %, and [M]m is from 0.4 atom % to 21.0 atom %.

4. An electronic component containing:
the soft magnetic metal powder according to claim 3.

5. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes at least S,
a unit of a concentration of S in the metal particle and the oxidized part is atom %,
the concentration of S in the metal particle and the oxidized part has a maximum value in the oxidized part,
wherein an average value of the concentration of S in the metal particle is expressed as [S]a,
an average value of the maximum value of the concentration of S in the oxidized part is expressed as [S]m, and
wherein [S]m−[S]a is 0.2 atom % or more and 5.0 atom % or less.

6. An electronic component containing:
the soft magnetic metal powder according to claim 5.

7. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes at least S,
a unit of a concentration of S in the metal particle and the oxidized part is atom %,
the concentration of S in the metal particle and the oxidized part has a maximum value in the oxidized part,
wherein an average value of the concentration of S in the metal particle is expressed as [S]a,
an average value of the maximum value of the concentration of S in the oxidized part is expressed as [S]m,
[S]m−[S]a is 0.2 atom % or more,
wherein [S]a is from 0 atom % to 5.0 atom %, and [S]m is from 0.2 atom % to 10.0 atom %.

8. An electronic component containing:
the soft magnetic metal powder according to claim 7.

9. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes S and at least one element M,
the element M is at least one kind of element selected from the group consisting of Nb, Ta, W, Zr, Hf, and Cr,
a unit of a concentration of each of S and the element M in the metal particle and the oxidized part is atom %,
the concentration of each of S and the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m,
wherein [M]m−[M]a is 0.4 atom % or more and 5.0 atom % or less,
an average value of the concentration of S in the metal particle is expressed as [S]a,
an average value of the maximum value of the concentration of S in the oxidized part is expressed as [S]m, and
[S]m−[S]a is 0.2 atom % or more.

10. An electronic component containing:
the soft magnetic metal powder according to claim 9.

11. A soft magnetic metal powder including a plurality of soft magnetic metal particles,
wherein each of the soft magnetic metal particles includes a metal particle and an oxidized part covering the metal particle, the metal particle includes at least Fe,
the oxidized part includes S and at least one element M,
the element M is at least one kind of element selected from the group consisting of Nb, Ta, W, Zr, Hf, and Cr,
a unit of a concentration of each of S and the element M in the metal particle and the oxidized part is atom %,
the concentration of each of S and the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m,
[M]m−[M]a is 0.4 atom % or more,
wherein [M]a is from 0 atom % to 16.0 atom %, and
[M]m is from 0.4 atom% to 21.0 atom%,
an average value of the concentration of S in the metal particle is expressed as [S]a,
an average value of the maximum value of the concentration of S in the oxidized part is expressed as [S]m, and
[S]m−[S]a is 0.2 atom % or more.

12. An electronic component containing:
the soft magnetic metal powder according to claim 11.

13. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes S and at least one element M,
the element M is at least one kind of element selected from the group consisting of Nb, Ta, W, Zr, Hf, and Cr,
a unit of a concentration of each of S and the element M in the metal particle and the oxidized part is atom %,
the concentration of each of S and the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m,
[M]m−[M]a is 0.4 atom % or more,
an average value of the concentration of S in the metal particle is expressed as [S]a,
an average value of the maximum value of the concentration of S in the oxidized part is expressed as [S]m, and
wherein [S]m−[S]a is 0.2 atom % or more and 5.0 atom % or less.

14. An electronic component containing:
the soft magnetic metal powder according to claim 13.

15. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes S and at least one element M,
the element M is at least one kind of element selected from the group consisting of Nb, Ta, W, Zr, Hf, and Cr,
a unit of a concentration of each of S and the element M in the metal particle and the oxidized part is atom %,
the concentration of each of S and the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m,
[M]m−[M]a is 0.4 atom % or more,
an average value of the concentration of S in the metal particle is expressed as [S]a,
an average value of the maximum value of the concentration of S in the oxidized part is expressed as [S]m, and
[S]m−[S]a is 0.2 atom % or more,
wherein [S]a is from 0 atom % to 5.0 atom %, and
[S]m is from 0.2 atom % to 10.0 atom %.

16. An electronic component containing:
the soft magnetic metal powder according to claim 15.

17. A soft magnetic metal powder including a plurality of soft magnetic metal particles,
wherein each of the soft magnetic metal particles includes a metal particle and an oxidized part covering the metal particle,
the metal particle includes at least Fe,
the oxidized part includes at least one element M,
the element M is at least one kind of element selected from the group consisting of Nb, Ta, W, Zr, Hf, and Cr,
a unit of a concentration of the element M in the metal particle and the oxidized part is atom %
the concentration of the element M in the metal particle and the oxidized part has a maximum value in the oxidized part,
wherein an average value of the concentration of the element M in the metal particle is expressed as [M]a,
an average value of the maximum value of the concentration of the element M in the oxidized part is expressed as [M]m, and
[M]m−[M]a is 0.4 atom % or more,
wherein the element M is at least one kind of element M' selected from the group consisting of Nb, Ta, W, Zr, and Hf, or
the element M consists of Cr and at least one kind of the element M'.

18. An electronic component containing:
the soft magnetic metal powder according to claim 17.

* * * * *